US012667123B2

(12) United States Patent

Mochimaru

(10) Patent No.: US 12,667,123 B2
(45) Date of Patent: Jun. 30, 2026

(54) ACETIC ACID-CONTAINING FOOD OR DRINK

(71) Applicants: Mizkan Holdings Co., Ltd., Aichi (JP); Mizkan Co., Ltd., Aichi (JP)

(72) Inventor: Shinsuke Mochimaru, Aichi (JP)

(73) Assignees: MIZKAN CO., LTD., Aichi (JP); MIZKAN HOLDINGS CO., LTD., Aichi (JP)

( * ) Notice: Subject to any disclaimer, the term of this patent is extended or adjusted under 35 U.S.C. 154(b) by 904 days.

(21) Appl. No.: 17/850,437

(22) Filed: Jun. 27, 2022

(65) Prior Publication Data

US 2022/0330583 A1 Oct. 20, 2022

Related U.S. Application Data

(63) Continuation-in-part of application No. PCT/JP2020/046852, filed on Dec. 16, 2020.

(30) Foreign Application Priority Data

Dec. 25, 2019 (JP) ................................. 2019-233968

(51) Int. Cl.
| | |
|---|---|
| *A23L 2/68* | (2006.01) |
| *A23L 5/20* | (2016.01) |
| *A23L 23/00* | (2016.01) |
| *A23L 27/20* | (2016.01) |
| *A23L 27/60* | (2016.01) |
| *C12J 1/00* | (2006.01) |

(52) U.S. Cl.
CPC .................... *A23L 2/68* (2013.01); *A23L 5/27* (2016.08); *A23L 23/00* (2016.08); *A23L 27/2028* (2016.08); *A23L 27/60* (2016.08); *C12J 1/00* (2013.01)

(58) Field of Classification Search
CPC .......... A23L 27/60; A23L 29/035; A23L 2/68
See application file for complete search history.

(56) References Cited

FOREIGN PATENT DOCUMENTS

| | | | |
|---|---|---|---|
| EP | 3550008 | A1 | 10/2019 |
| JP | 2005015686 | A | 1/2005 |
| JP | 2010124696 | A | 6/2010 |
| JP | 2013099316 | A | 5/2013 |
| JP | 2013529469 | A | 7/2013 |
| JP | 6792251 | B1 | 11/2020 |
| JP | 6792252 | B1 | 11/2020 |
| JP | 2021101635 | A | 7/2021 |
| WO | 2011163664 | A1 | 12/2011 |
| WO | WO-2019003392 | A1 * | 1/2019 ............. A23L 27/60 |

OTHER PUBLICATIONS

Burdock, G.A., "Butyl Propionate", Fenaroli's Handbook of Flavor Ingredients, Sixth Edition, CRC Press, 2010, p. 217. (Year: 2010).*

Xiao et al., "Discrimination of Chinese Vinegars Based on Headspace Solid-Phase Microextraction-Gas Chromatography Mass Spectrometry of Volatile Compounds and Multivariate Analysis", Journal of Food Science, vol. 76, Nr. 8, (2011), pp. C1125-C1135. (Year: 2011).*

Suzuki et al. (WO 2019/003392 A1—Clarivate Analytics translation) (Year: 2019).*

Jeong et al., "Volatiles Flavor Compounds in Commercial Vinegar Beverages Derived from Fruits", Journal of Life Science, vol. 21, No. 2, (2011), pp. 202-209. (Year: 2011).*

Extended European Search Report issued in corresponding European Patent Application No. 20907616.5, dated Nov. 30, 2022 (4 pages).

Office Action issued in corresponding European Patent Application No. 20907616.5, dated Dec. 12, 2022 (4 pages).

International Preliminary Report on Patentability issued in corresponding International Application No. PCT/JP2020/046852; mailed Jul. 7, 2022 (6 pages).

Aroma component of vinegar, Chemistry and Biology, 1968, vol. 6, No. 6, pp. 351-355 (5 pages).

Chung, N. et al., "Rice vinegars of different origins: discriminative characteristics based on solid-phase microextraction and gas chromatography with mass spectrometry, an electronic nose, electronic tongue and sensory evaluation," Journal of the Institute of Brewing, vol. 123, pp. 159-166, Mar. 17, 2017 (8 pages).

Journal of the Brewing Society of Japan, vol. 75, No. 9, pp. 717-728, 1980 (12 pages).

Office Action issued in corresponding Japanese Patent Application No. 2019-233968; dated Feb. 18, 2020 (7 pages).

Office Action issued in corresponding Japanese Patent Application No. 2019-233968; dated Jun. 9, 2020 (4 pages).

Notice of Reasons for Revocation issued in corresponding Japanese Patent Application No. 2019-233968; dated Sep. 1, 2021 (16 pages).

International Search Report issued in corresponding International Application No. PCT/JP2020/046852; mailed Jan. 26, 2021 (7 pages).

Written Opinion of the International Searching Authority issued in corresponding International Aplication No. PCT/JP2020/046852; dated Jan. 26, 2021 (4 pages).

* cited by examiner

*Primary Examiner* — Elizabeth Gwartney

(74) *Attorney, Agent, or Firm* — Osha Bergman Watanabe & Burton LLP

(57) ABSTRACT

An acetic acid-containing drink contains 0.02 w/v % or more of acetic acid and may also contain butyl propionate and/or isoamyl acetate. A method for producing an acetic acid-containing drink with reduced acetic acid odor and/or reduced pungent odor includes incorporating acetic acid at a concentration of 0.02 w/v % or more and also incorporating butyl propionate and/or isoamyl acetate into the drink.

15 Claims, No Drawings

ACETIC ACID-CONTAINING FOOD OR DRINK

CROSS-REFERENCE TO RELATED APPLICATION

This application claims priority to and the benefit of PCT Application PCT/JP2020/046852, filed Dec. 16, 2020, and JP Application 2019-233968, filed Dec. 25, 2019, the contents of which are incorporated by reference in their entirety.

TECHNICAL FIELD

The present invention relates to a food or drink containing acetic acid; etc.

BACKGROUND ART

Acetic acid is used in various foods as a flavoring ingredient and for its expected bacteriostatic effect etc. In recent years, as people have become more health-conscious, acetic acid has been widely consumed as a beverage in expectation of its various beneficial effects, such as improving obesity, controlling blood pressure, and suppressing elevated blood glucose levels.

However, acetic acid-containing foods or drinks may have an unpleasant acid odor (acetic acid odor) particular to acetic acid, as well as a pungent odor derived from components generated during the production of acetic acid (in particular, brewed vinegar) or storage of acetic acid (e.g., ethyl acetate, acetaldehyde, etc.), which may hinder the intake of foods or drinks containing acetic acid. In particular, it is important to consume an acetic acid-containing food or drink on a daily basis if the beneficial effects mentioned above are to be expected. Therefore, solving the acetic acid odor and pungent odor problems is particularly important.

Patent literature (PTL 1) discloses a method for reducing acetic acid odor of an acetic acid-containing food or drink without producing adverse effects on food taste in a simple and versatile manner in which hexanal is added to the acetic acid-containing food or drink in such an amount that the content mass ratio of acetic acid to hexanal falls within a specific range. However, PTL 1 discloses no measures for pungent odor.

Further, acetic acid-containing foods or drinks, in particular drinks, may have a watery taste and weak body sensation. Solving these problems is also important to realize daily consumption of an acetic acid-containing food or drink with the expectation of the beneficial effects described above.

CITATION LIST

Patent Literature

PTL 1: JP2010-124696A

SUMMARY OF INVENTION

The present invention includes the following embodiments.

Item 1. An acetic acid-containing food or drink comprising 0.02 w/v % or more of acetic acid and at least one member selected from the group consisting of butyl propionate (component a) and isoamyl acetate (component b).

Item 2. The acetic acid-containing food or drink according to Item 1, wherein the content of component a is 0.05 to 100000 ppb.

Item 3. The acetic acid-containing food or drink according to Item 1 or 2, wherein the content of component b is 0.005 to 50000 ppb.

Item 4. The acetic acid-containing food or drink according to any one of Items 1 to 3, further comprising 2-butanone (component c).

Item 5. The acetic acid-containing food or drink according to Item 4, wherein the content of component c is 0.01 to 15000 ppb.

Item 6. The acetic acid-containing food or drink according to any one of Items 1 to 5, further comprising 3-methylbutanal (component d).

Item 7. The acetic acid-containing food or drink according to Item 6, wherein the content of component d is 0.01 to 15000 ppb.

Item 8. The acetic acid-containing food or drink according to any one of Items 1 to 7, wherein the ratio of the acetic acid content to the total content of components a and b (acetic acid concentration value (w/v %)/total concentration value of a and b (ppb)) is 0.00002 to 100.

Item 9. The acetic acid-containing food or drink according to any one of Items 1 to 8, wherein the ratio of the ethyl acetate content to the total content of components a and b (ethyl acetate concentration value (ppm)/total concentration value of a and b (ppb)) is 0.0001 to 25000.

Item 10. The acetic acid-containing food or drink according to any one of Items 1 to 9, wherein the ratio of the acetaldehyde content to the total content of components a and b (acetaldehyde concentration value (ppm)/total concentration value of a and b (ppb)) is 0.0001 to 12500.

Item 11. The acetic acid-containing food or drink according to any one of Items 1 to 10, wherein the ratio of the acetic acid content to the total content of component a, component b, 2-butanone (component c), and 3-methylbutanal (component d) (acetic acid concentration value (w/v %)/total concentration value of a to d (ppb)) is 0.00002 to 100.

Item 12. The acetic acid-containing food or drink according to any one of Items 1 to 11, which is a food or drink to be eaten or drunk as is.

Item 13. The acetic acid-containing food or drink according to any one of Items 1 to 11, which is a composition for preparing a food or drink to be eaten or drunk.

Item 14. The acetic acid-containing food or drink according to any one of Items 1 to 13, which is a drink, a composition for preparing a drink, or a seasoning.

Item 15. A method for producing an acetic acid-containing food or drink with reduced acetic acid odor and/or reduced pungent odor, the method comprising incorporating acetic acid at a concentration of 0.02 w/v % or more, and incorporating at least one member selected from the group consisting of butyl propionate (component a) and isoamyl acetate (component b).

Item 16. A method for suppressing acetic acid odor and/or pungent odor of an acetic acid-containing food or drink, the method comprising incorporating at least one member selected from the group consisting of butyl propionate (component a) and isoamyl acetate (component b) into an acetic acid-containing food or drink.

Item 17. A composition for suppressing acetic acid odor and/or pungent odor of an acetic acid-containing food or drink, the composition comprising at least one member selected from the group consisting of butyl propionate (component a) and isoamyl acetate (component b).

Item X. An acetic acid-containing food or drink comprising 0.02 w/v % or more of acetic acid and butyl propionate (component a), wherein the content of component a is 0.05 to 100000 ppb, and the ratio of the acetic acid content to the total content of component a and isoamyl acetate (component b) (acetic acid concentration value (w/v %)/total concentration value of a and b (ppb)) is 0.00002 to 100.

DESCRIPTION OF EMBODIMENTS

In the present specification, the expressions "comprise," "contain," and "include" include the concepts of "comprise," "consist essentially of," and "consist of."

In the present specification, the expression "and/or" includes the meanings of "and" and "or."

For example, the expression "a and/or b" includes the meanings of both "a and b" and "a or b," and represents the three cases of a alone, b alone, and both a and b.

The present invention according to one embodiment relates to an acetic acid-containing food or drink comprising 0.02 w/v % or more of acetic acid and at least one member selected from the group consisting of butyl propionate (component a) and isoamyl acetate (component b) (which may be referred to herein as "the acetic acid-containing food or drink of the present invention"). This acetic acid-containing food or drink is described below.

The method for calculating the concentration of each component in the acetic acid-containing food or drink of the present invention is as follows. The concentration of each component in the acetic acid-containing food or drink of the present invention can be calculated from the amount of the component and the volume of the acetic acid-containing food or drink when the amount of the component is known (for example, when the acetic acid-containing food or drink is obtained by mixing purified components). When the amount of the component is unknown, the concentration of the component can be calculated in accordance with or based on the method described in Test Example 2 later. In the present specification, "ppm" and "ppb" are both mass concentrations (w/w).

The acetic acid-containing food or drink of the present invention contains acetic acid. Acetic acid refers to acetic acid molecules ($CH_3COOH$) and acetate ions ($CH_3COO^-$), and the acetic acid content refers to the total concentration of these. The content of acetic acid in the acetic acid-containing food or drink of the present invention is not particularly limited as long as it is 0.02 w/v % or more. When the acetic acid content is at this level, and further when the acetic acid concentration is not less than the preferred lower limits below, the acetic acid odor becomes more unpleasant; that is, the need for the acetic acid odor suppression technique of the present invention is increased. The acetic acid content is preferably 0.02 to 15 w/v %, more preferably 0.02 to 10 w/v %, even more preferably 0.02 to 3 w/v %, still even more preferably 0.04 to 1.5 w/v %, particularly preferably 0.04 to 1 w/v %, and furthermore particularly preferably 0.05 to 0.5 w/v %, from the viewpoint of being suitable for eating or drinking (particularly drinking) as is and from the viewpoint of being suitable for the preparation of a food or drink to be eaten or drunk (particularly being suitable for eating or drinking (particularly drinking) as is). Ranges in which the upper and lower limits of the above ranges are arbitrarily exchanged and ranges in which the upper and lower limits of the above ranges are arbitrarily combined are also exemplified in the present specification. The origin of the acetic acid in the acetic acid-containing food or drink of the present invention is not particularly limited as long as it is suitable for foods or drinks. For example, the acetic acid may be derived from a food additive (the acetic acid of the acetic acid-containing food or drink of the present invention may be the acetic acid contained in a food additive), or derived from a seasoning, a food ingredient, etc. contained in the food or drink (the acetic acid of the acetic acid-containing food or drink of the present invention may be the acetic acid contained in a seasoning, a food ingredient, etc.).

The acetic acid-containing food or drink of the present invention can contain ethyl acetate and/or acetaldehyde as a pungent odor source together with acetic acid. The content of ethyl acetate in the acetic acid-containing food or drink of the present invention is preferably 0.1 ppm or more, more preferably 1 ppm or more, and even more preferably 3 ppm or more, from the viewpoint that, for example, the pungent odor derived from ethyl acetate becomes stronger; that is, the need for the pungent odor suppression technique of the present invention is increased. The upper limit of the content is not particularly limited, and is, for example, 20000 ppm, 10000 ppm, 3000 ppm, 1000 ppm, 300 ppm, 100 ppm, or 50 ppm. The content of acetaldehyde in the acetic acid-containing food or drink of the present invention is preferably 0.01 ppm or more, more preferably 0.1 ppm or more, and even more preferably 1 ppm or more, from the viewpoint that, for example, the pungent odor derived from acetaldehyde becomes stronger; that is, the need for the pungent odor suppression technique of the present invention is increased. The upper limit of the content is not particularly limited, and is, for example, 20000 ppm, 10000 ppm, 3000 ppm, 1000 ppm, 300 ppm, 100 ppm, or 50 ppm. Ranges in which the upper and lower limits of the above ranges are arbitrarily combined are also exemplified in the present specification.

Component a (butyl propionate, propanoic acid, butyl ester (CAS registry No.: 590-01-2)) is an aromatic component and has the following aroma characteristics in an aromatic component database (Aroma Office Ver. 7.0 produced by Nishikawa Keisoku Co., Ltd.): sweet, red fruit, and strawberry. Component a can suppress acetic acid odor and/or pungent odor, and improve body sensation. Furthermore, the acetic acid odor and/or pungent odor suppression effect, and/or the body sensation can be further improved by adjusting the content of component a.

When the acetic acid-containing food or drink of the present invention contains component a, the content of component a in the acetic acid-containing food or drink of the present invention is not particularly limited as long as component a can exert an acetic acid odor and/or pungent odor suppression effect and a body sensation improvement effect, alone or together with another component. The content of component a is, for example, 0.02 to 100000 ppb. For example, from the viewpoint of further improving the acetic acid odor and/or pungent odor suppression effect and/or further improving the body sensation, and from the viewpoint of suppressing unpleasant acetic acid odor and/or pungent odor while maintaining the fresh smell of acetic acid and further improving the body sensation, the content of component a is preferably 0.05 to 100000 ppb, more preferably 0.1 to 100000 ppb, even more preferably 0.2 to 100000 ppb, still even more preferably 0.5 to 100000 ppb, particularly preferably 0.8 to 100000 ppb, and furthermore particularly preferably 0.8 to 50000 ppb. The upper or lower limit of the content may be lower or higher than the above ranges; and these values may be, for example, 1 ppb, 3 ppb, 10 ppb, 30 ppb, 100 ppb, 300 ppb, 800 ppb, 1000 ppb, 3000 ppb, or 10000 ppb. Ranges in which the upper and lower limits of the above ranges are arbitrarily exchanged and ranges in which the upper and lower limits of the above ranges are arbitrarily combined are also exemplified in the present specification. The origin of component a in the acetic acid-containing food or drink of the present invention is not particularly limited as long as it is suitable for foods or drinks. For example, component a may be derived from a formulation added, such as a flavor (component a of the acetic acid-containing food or drink of the present invention may be component a contained in a formulation), or derived from a seasoning, a food ingredient, etc. contained in the food or drink (component a of the acetic acid-containing food or drink of the present invention may be component a contained in a seasoning, a food ingredient, etc.).

Component b (isoamyl acetate, 1-butanol, 3-methyl-, acetate (CAS registry NO.: 123-92-2)) is an aromatic component and has the following aroma characteristics in an aromatic component database (Aroma Office Ver. 7.0 produced by Nishikawa Keisoku Co., Ltd.): resin, banana, and melon-like. Component b can suppress acetic acid odor and/or pungent odor, and improve body sensation. Furthermore, the acetic acid odor and/or pungent odor suppression effect, and/or the body sensation can be further improved by adjusting the content of component b.

When the acetic acid-containing food or drink of the present invention contains component b, the content of component b in the acetic acid-containing food or drink of the present invention is not particularly limited as long as component b can exert an acetic acid odor and/or pungent odor suppression effect and a body sensation improvement effect, alone or together with another component. The content of component b is, for example, 0.002 to 100000 ppb. For example, from the viewpoint of further improving the acetic acid odor and/or pungent odor suppression effect and/or further improving the body sensation, and from the viewpoint of suppressing unpleasant acetic acid odor and/or pungent odor while maintaining the fresh smell of acetic acid and further improving the body sensation, the content of component b is preferably 0.005 to 50000 ppb, more preferably 0.1 to 50000 ppb, even more preferably 0.5 to 50000 ppb, still even more preferably 2 to 50000 ppb, particularly preferably 10 to 50000 ppb, furthermore particularly preferably 20 to 50000 ppb, and even furthermore particularly preferably 20 to 20000 ppb. The upper or lower limit of the content may be lower or higher than the above ranges; and these values may be, for example, 30 ppb, 100 ppb, 300 ppb, 800 ppb, 1000 ppb, 3000 ppb, or 10000 ppb. Ranges in which the upper and lower limits of the above ranges are arbitrarily exchanged and ranges in which the upper and lower limits of the above ranges are arbitrarily combined are also exemplified in the present specification. The origin of component b in the acetic acid-containing food or drink of the present invention is not particularly limited as long as it is suitable for foods or drinks. For example, component b may be derived from a formulation added, such as a flavor (component b of the acetic acid-containing food or drink of the present invention may be component a contained in a formulation), or derived from a seasoning, a food ingredient, etc. contained in the food or drink (component a of the acetic acid-containing food or drink of the present invention may be component b contained in a seasoning, a food ingredient, etc.).

The total content of components a and b in the acetic acid-containing food or drink of the present invention is not particularly limited as long as an acetic acid odor and/or pungent odor suppression effect and a body sensation improvement effect can be exerted. The meaning of total content is in the literal sense. When the acetic acid-containing food or drink of the present invention contains both component a and component b, the total content indicates the sum of the content of component a and the content of component b. When the acetic acid-containing food or drink of the present invention contains component a and does not contain component b, the total content indicates the content of component a. When the acetic acid-containing food or drink of the present invention contains component b and does not contain component a, the total content indicates the content of component b. The total content of components a and b is, for example, 0.002 to 200000 ppb. For example, from the viewpoint of further improving the acetic acid odor and/or pungent odor suppression effect and/or further improving the body sensation, and from the viewpoint of suppressing unpleasant acetic acid odor and/or pungent odor while maintaining the fresh smell of acetic acid and further improving the body sensation, the total content is, preferably 0.005 to 100000 ppb, more preferably 0.1 to 100000 ppb, even more preferably 0.2 to 100000 ppb, still even more preferably 0.5 to 100000 ppb, particularly preferably 0.8 to 100000 ppb, furthermore preferably 1 to 50000 ppb, and still furthermore preferably 1 to 20000 ppb. The upper or lower limit of the total content may be lower or higher than the above ranges; and these values may be, for example, 3 ppb, 10 ppb, 30 ppb, 100 ppb, 300 ppb, 800 ppb, 1000 ppb, 3000 ppb, or 10000 ppb. Ranges in which the upper and lower limits of the above ranges are arbitrarily exchanged and ranges in which the upper and lower limits of the above ranges are arbitrarily combined are also exemplified in the present specification.

In one embodiment of the present invention, the ratio of the acetic acid content to the total content of components a and b (acetic acid/total content of a and b) is preferably within a certain range, for example, from the viewpoint of more effectively exerting the acetic acid odor suppression effect and from the viewpoint of suppressing unpleasant acetic acid odor while maintaining the fresh smell of acetic acid. The ratio (=the ratio obtained by dividing the numerical value of the acetic acid concentration when the unit is w/v % by the numerical value of the total concentration of components a and b when the unit is ppb (acetic acid concentration value (w/v %)/total concentration value of a and b (ppb)) is, for example, 0.000001 to 100, preferably 0.00002 to 100, more preferably 0.0001 to 50, even more preferably 0.0002 to 50, still even more preferably 0.0005 to 50, particularly preferably 0.001 to 50, and furthermore preferably 0.001 to 20. The upper or lower limit of the ratio may be lower or higher than the above ranges; and these values may be, for example, 0.01, 0.1, 0.3, 1, 3, or 10. Ranges in which the upper and lower limits of the above ranges are arbitrarily exchanged and ranges in which the upper and lower limits of the above ranges are arbitrarily combined are also exemplified in the present specification.

In one embodiment of the present invention, the ratio of the ethyl acetate content to the total content of components a and b (ethyl acetate/total content of a and b) is preferably within a certain range, for example, from the viewpoint of more effectively exerting the pungent odor suppression effect and from the viewpoint of suppressing unpleasant pungent odor while maintaining the fresh smell of acetic acid. The ratio (=the ratio obtained by dividing the numerical value of the ethyl acetate concentration when the unit is ppm by the numerical value of the total concentration of components a and b when the unit is ppb (ethyl acetate concentration value (ppm)/total concentration value of a and b (ppb)) is, for example, 0.00004 to 25000, preferably 0.0001 to 25000, more preferably 0.001 to 15000, even more preferably 0.01 to 10000, and still even more preferably 0.1 to 8000. The upper or lower limit of the ratio may be lower or higher than the above ranges; and these values may be, for example, 0.3, 1, 3, 10, 30, 100, 300, 1000, 3000, or 5000.

Ranges in which the upper and lower limits of the above ranges are arbitrarily exchanged and ranges in which the upper and lower limits of the above ranges are arbitrarily combined are also exemplified in the present specification.

In one embodiment of the present invention, the ratio of acetaldehyde content to the total content of components a and b (acetaldehyde/total content of a and b) is preferably within a certain range, for example, from the viewpoint of more effectively exerting the pungent odor suppression effect and from the viewpoint of suppressing unpleasant pungent odor while maintaining the fresh smell of acetic acid. The ratio (=the ratio obtained by dividing the numerical value of the acetaldehyde concentration when the unit is ppm by the numerical value of the total concentration of components a and b when the unit is ppb (acetaldehyde concentration value (ppm)/total concentration value of a and b (ppb)) is, for example, 0.00004 to 12500, preferably 0.0001 to 12500, more preferably 0.001 to 10000, even more preferably 0.01 to 8000, and still even more preferably 0.1 to 6000. The upper or lower limit of the ratio may be lower or higher than the above ranges; and these values may be, for example, 0.3, 1, 3, 10, 30, 100, 300, 1000, 3000, or 5000. Ranges in which the upper and lower limits of the above ranges are arbitrarily exchanged and ranges in which the upper and lower limits of the above ranges are arbitrarily combined are also exemplified in the present specification.

In one preferred embodiment of the present invention, the acetic acid-containing food or drink of the present invention contains both component a and component b. This can further improve the acetic acid odor and/or pungent odor suppression effect and/or further improve the body sensation. In this case, from the viewpoint of further improving the effects, the content of component a (or component b) is preferably 0.5 to 99.5%, more preferably 1 to 99%, and even more preferably 1.5 to 98.5%, based on the total content of components a and b taken as 100%. Ranges in which the upper and lower limits of the above ranges are arbitrarily exchanged and ranges in which the upper and lower limits of the above ranges are arbitrarily combined are also exemplified in the present specification.

In one preferred embodiment of the present invention, the acetic acid-containing food or drink of the present invention further contains component c in addition to component a and/or component b. Component c (2-butanone (CAS registry NO.: 78-93-3)) is an aromatic component and has the following aroma characteristics in an aromatic component database (Aroma Office Ver. 7.0 produced by Nishikawa Keisoku Co., Ltd.): butter, cheese, chocolate, fruity, sweet, and mint-like. Component c can suppress acetic acid odor and/or pungent odor, and/or improve body sensation (in particular, suppress pungent odor). Furthermore, these effects can be further improved by adjusting the content of component c.

When the acetic acid-containing food or drink of the present invention contains component c, the content of component c in the acetic acid-containing food or drink of the present invention is not particularly limited. The content is preferably 0.01 to 15000 ppb, more preferably 0.1 to 15000 ppb, even more preferably 0.2 to 15000 ppb, still even more preferably 0.5 to 15000 ppb, and particularly preferably 1 to 10000 ppb, for example, from the viewpoint of further suppressing acetic acid odor and/or pungent odor and/or further improving the body sensation (in particular, suppressing pungent odor). Ranges in which the upper and lower limits of the above ranges are arbitrarily exchanged and ranges in which the upper and lower limits of the above ranges are arbitrarily combined are also exemplified in the present specification.

present specification. The origin of component c in the acetic acid-containing food or drink of the present invention is not particularly limited as long as it is suitable for foods or drinks. For example, component c may be derived from a formulation added, such as a flavor (component c of the acetic acid-containing food or drink of the present invention may be component c contained in a formulation), or derived from a seasoning, a food ingredient, etc. contained in the food or drink (component c of the acetic acid-containing food or drink of the present invention may be component c contained in a seasoning, a food ingredient, etc.).

In one preferred embodiment of the present invention, the acetic acid-containing food or drink of the present invention further contain component d in addition to component a and/or component b. Component d (3-methylbutanal, butanal, 3-methyl-(CAS registry NO.: 590-86-3)) is an aromatic component and has the following aroma characteristics in an aromatic component database (Aroma Office Ver. 7.0 produced by Nishikawa Keisoku Co., Ltd.): almond, bread, candy, caramel, cheese, chocolate, coffee, hazelnut, wheat, meat, mint, mushroom, nutty, peach, cocoa, ripe fruit, acid, and toast. Component d can suppress acetic acid odor and/or pungent odor and/or improve body sensation (in particular, suppress acetic acid odor). Furthermore, these effects can be further improved by adjusting the content of component d.

When the acetic acid-containing food or drink of the present invention contains component d, the content of component d in the acetic acid-containing food or drink of the present invention is not particularly limited. The content is preferably 0.01 to 15000 ppb, more preferably 0.02 to 15000 ppb, even more preferably 0.05 to 15000 ppb, still even more preferably 0.1 to 15000 ppb, and particularly preferably 0.1 to 10000 ppb, for example, from the viewpoint of further suppressing acetic acid odor and/or pungent odor and/or further improving the body sensation (in particular, suppressing acetic acid odor). Ranges in which the upper and lower limits of the above ranges are arbitrarily exchanged and ranges in which the upper and lower limits of the above ranges are arbitrarily combined are also exemplified in the present specification. The origin of component d in the acetic acid-containing food or drink of the present invention is not particularly limited as long as it is suitable for foods or drinks. For example, component d may be derived from a formulation added, such as a flavor (component d of the acetic acid-containing food or drink of the present invention may be component d contained in a formulation), or derived from a seasoning, a food ingredient, etc. contained in the food or drink (component d of the acetic acid-containing food or drink of the present invention may be component d contained in a seasoning, a food ingredient, etc.).

In one preferred embodiment of the present invention, the acetic acid-containing food or drink of the present invention contains both component c and component d. This can further improve the acetic acid odor and/or pungent odor suppression effect and/or improve the body sensation (in particular, further improve the acetic acid odor and pungent odor suppression effect). In this case, from the viewpoint of further improving the effects, the content of component c (or component d) is preferably 5 to 95%, more preferably 10 to 90%, and even more preferably 15 to 85%, based on the total content of components c and d taken as 100%. Ranges in which the upper and lower limits of the above ranges are arbitrarily exchanged and ranges in which the upper and lower limits of the above ranges are arbitrarily combined are also exemplified in the present specification.

In one preferred embodiment of the present invention, the ratio of the acetic acid content to the total content of components a, b, c, and d in the acetic acid-containing food or drink of the present invention (acetic acid/total content of a to d) is preferably within a certain range. The ratio (=the ratio obtained by dividing the numerical value of the acetic acid concentration when the unit is w/v % by the numerical value of the total concentration of components a to d when the unit is ppb (acetic acid concentration value (w/v %)/total concentration value of a to d (ppb)) is, for example, 0.000001 to 100, preferably 0.00002 to 100, more preferably 0.0001 to 50, even more preferably 0.0002 to 50, still even more preferably 0.0005 to 50, particularly preferably 0.001 to 50, and furthermore particularly preferably 0.001 to 20. Ranges in which the upper and lower limits of the above ranges are arbitrarily exchanged and ranges in which the upper and lower limits of the above ranges are arbitrarily combined are also exemplified in the present specification.

In one preferred embodiment of the present invention, the ratio of the ethyl acetate content to the total content of components a, b, c, and d in the acetic acid-containing food or drink of the present invention (ethyl acetate/total content of a to d) is preferably within a certain range. The ratio (=the ratio obtained by dividing the numerical value of the ethyl acetate concentration when the unit is ppm by the numerical value of the total concentration of components a to d when the unit is ppb (ethyl acetate concentration value (ppm)/total concentration value of a to d (ppb)) is, for example, 0.00004 to 25000, preferably 0.0001 to 25000, more preferably 0.001 to 15000, even more preferably 0.01 to 10000, and still even more preferably 0.1 to 8000. Ranges in which the upper and lower limits of the above ranges are arbitrarily exchanged and ranges in which the upper and lower limits of the above ranges are arbitrarily combined are also exemplified in the present specification.

In one preferred embodiment of the present invention, the ratio of the acetaldehyde content to the total content of components a, b, c, and d in the acetic acid-containing food or drink of the present invention (acetaldehyde/total content of a to d) is preferably within a certain range. The ratio (=the ratio obtained by dividing the numerical value of the acetaldehyde concentration when the unit is ppm by the numerical value of the total concentration of components a to d when the unit is ppb (acetaldehyde concentration value (ppm)/total concentration value of a to d (ppb)) is, for example, 0.00004 to 12500, preferably 0.0001 to 12500, more preferably 0.001 to 10000, even more preferably 0.01 to 8000, and still even more preferably 0.1 to 6000. Ranges in which the upper and lower limits of the above ranges are arbitrarily exchanged and ranges in which the upper and lower limits of the above ranges are arbitrarily combined are also exemplified in the present specification.

The properties and state of the acetic acid-containing food or drink of the present invention are not particularly limited as long as they are those that the food or drink can take. For example, the acetic acid-containing food or drink of the present invention is in the form of a liquid, emulsion, gel, foam, solid, or the like. The acetic acid-containing food or drink of the present invention encompasses those in a single form and those composed of any combination of foods and drinks in multiple forms.

The acetic acid-containing food or drink is not particularly limited, and examples includes a food or drink to be eaten or drunk as is, a composition for preparing a food or drink to be eaten or drunk (i.e., a composition to be used for preparing a food or drink to be eaten or drunk as is), and the like. The phrase "food or drink to be eaten or drunk as is"

include not only a food or drink to be eaten or drunk without adding any components, but also a food or drink to be eaten or drunk with a seasoning appropriately added as necessary by a person who eats or drinks the food or drink at the time of eating or drinking.

Examples of the food or drink to be eaten or drunk as is include, but are not limited to, drinks, cooked rice, noodles, prepared foods, soups, packed lunches, and the like. Of these, for example, drinks are preferable.

Examples of drinks include fruit juice-containing beverages, such as fruit juices, flavored beverages, flavored water, beauty drinks, and smoothies of citrus fruits (e.g., mandarin, orange, lemon, lime, grapefruit, *Citrus junos, Citrus sphaerocarpa, Citrus sudachi*, bergamot, pink grapefruit, and *Citrus hassaku*), tropical fruits (e.g., pineapple, banana, guava, mango, acerola, papaya, and passion fruit), lychee, strawberry, apple, peach, grape, white grape, cassis, raspberry, pomegranate, Japanese plum, pear, apricot, Asian plum, kiwifruit, melon, blueberry, and acai; dairy product-containing beverages, such as milk and beverages containing milk or milk components (e.g., processed products of milk, such as skimmed milk powder, whole milk powder, milk concentrate, yogurt, dairy cream, condensed milk, butter, skimmed milk, cream powder, sweetened milk powder, modified milk powder, whey powder, and buttermilk powder); vegetable beverages, such as juices, smoothies, and aojiru (green juice) of tomato, carrot, pumpkin, and the like; soft drinks, such as sports drinks, flavored beverages (e.g., lemonade), and fruit-flavored drinks; carbonated drinks; jelly beverages; grain beverages, such as grain beverages containing rice, soy milk, or almonds as a main ingredient; tea beverages, such as red tea, oolong tea, green tea, black tea, matcha tea, jasmine tea, rose hip tea, chamomile tea, and hojicha (Japanese green tea), and blended tea (e.g., pearl barley, barley, brown rice, soybeans, corn, and other grains, persimmon leaves, loquat leaves, leaves of kuma bamboo grass, *Gynostemma pentaphyllum*, ashitaba (*Angelica keiskei*), and dokudami (*Houttuynia cordata*), kelp, safflower, shiitake mushroom, and *Litchi chinensis*); coffee beverages; powdered beverages, such as cocoa and aojiru; alcoholic beverages, such as beers, beer-taste beverages (e.g., low-malt beers), fruit wines, sake, and other brewed liquors, shochu (Japanese distilled liquor), whiskey, brandy, spirits, and other distilled liquors, liqueurs, which are made by mixing a distilled liquor and sugar etc. as a secondary ingredient, and other mixed alcoholic beverages, cocktails, fizzes, and chuhai, which are made by further adding fruit juices, flavors, carbon dioxide, etc. to those alcoholic beverages; and the like.

Examples of cooked rice include white rice, salted rice, red bean rice, okowa (sticky glutinous rice), seasoned rice, mixed rice, rice balls, sushi rice, rice cakes, dumplings, and the like. Examples of "rice" include uruchimai (ordinary Japanese rice), glutinous rice, no-wash rice having different degrees of polishing, brown rice, and the like. Other examples include foods prepared using cooked rice and other ingredients, such as sushi, chirashi-sushi, curry and rice, rice bowl dishes, fried rice, tenshinhan (crab meat omelet on rice), and the like.

Noodles are foods that are made from dough made mainly from wheat flour, rice flour, buckwheat flour, beans, or other grain flours, and formed or processed into the shape of noodles, plates, ribbons, or the like; and that are cooked by boiling, simmering, or steaming. Noodles are not particularly limited in this regard. Examples include soba (buckwheat noodles), udon (wheat noodles), kishimen (noodles made in flat strips), ramen, Chinese noodles, pasta, macaroni, somen (thin noodles), pho, Korean cold noodles, glass noodles, and the like.

Prepared foods are foods obtained by cooking ingredients such as meat, seafood, eggs, milk, vegetables, fruits, herbs, and seaweed in an appropriate manner. Examples of prepared foods include pickles, simmered foods, grilled foods, fried foods, stir-fried foods, steamed foods, aemono (dressed dishes), and the like. Specific examples include sweet-and-sour pork, vinegared dishes, vinegar pickles, and the like.

Soups are water-rich foods obtained by cooking ingredients such as meat, seafood, eggs, milk, vegetables, fruits, herbs, and seaweed in an appropriate manner. Specific examples of soups include minestrone, suan la tang, paitan soup (white broth), jjigae soup (Korean stew), and the like.

Packed lunches are not particularly limited as long as they are one or more of the above-mentioned foods and drinks arranged in a container.

The composition for preparing a food or drink to be eaten or drunk is not particularly limited, and examples thereof include compositions for preparing a drink, seasonings, retort foods, and the like. Of these, for example, compositions for preparing a drink, seasonings, and the like are preferable, and compositions for preparing a drink is more preferable.

Examples of compositions for preparing a drink include a concentrated type of drink. This type is diluted with a suitable drink (e.g., water or a drink mentioned above) and then served for drinking. The recommended dilution factor is, for example, 1.1- to 50-fold, preferably 2- to 20-fold, more preferably 3- to 12-fold, and even more preferably 4- to 8-fold.

Examples of seasonings include, but are not limited to, sauces (e.g., yakiniku (grilled meat cuisine) sauces and sesame sauces and other sesame-containing seasonings), dressings (e.g., non-oil dressing, separated dressing, and emulsified dressing), seasoning vinegar (e.g., general-purpose seasoning vinegar, seasoning vinegar for vinegared dishes, seasoning vinegar for sushi rice, seasoning liquids for pickling (e.g., for pickles), and sweet vinegar), cooked rice seasonings, ponzu seasonings, dashi-containing seasonings (e.g., mentsuyu (soup bases) and hot-pot soup bases), natto seasonings, pickling seasonings, meat seasonings, vinegar, Worcestershire sauces, ketchup, oyster sauces, salsa, sambal sauces, chili sauces, spicy-spice-containing seasonings, chutney, mustard, mayonnaise, and the like.

Retort foods are not particularly limited as long as they are obtained by packaging cooked or semi-cooked foods inside a retort pouch or a can. Examples of foods to be packaged include the above-mentioned foods themselves, foods with which the above-mentioned foods can be obtained by simple cooking (for example, by adding ingredients and cooking with heat), and the like.

The acetic acid-containing food or drink of the present invention can contain other materials according to the type of food or drink. Examples of the other materials include water, saccharides (including high-intensity sweeteners), crushed fruits and vegetables obtained by cutting, grating, or other processes (e.g., squeezed juice such as fruit juice and vegetable juice, puree, and paste), flavors, vinegar, salt, amino acid-based seasonings, nucleic acid-based seasonings, organic acid-based seasonings (or acidulants), acidulants, flavor materials, umami seasonings, alcoholic beverages, fats and oils, spicy seasonings, spicy seasoning extracts, flavoring oils, viscosity adjusters, stabilizers, coloring agents, calcium salts, ingredients, and the like. The combinations and contents of these other materials are not particularly limited and can be appropriately set according to the type of food or drink.

The other materials described above can be suitably used, particularly in drinks, compositions for preparing a drink, and seasonings. Examples of other materials that can be suitably used, particularly in drinks and compositions for preparing a drink include water, saccharides (including high-intensity sweeteners), crushed fruits and vegetables obtained by cutting, grating, or other processes (e.g., squeezed juice such as fruit juice and vegetable juice, puree, and paste), flavors, vinegar, salt, stabilizers, coloring agents, calcium salts, amino acid-based seasonings, nucleic acid-based seasonings, organic acid-based seasonings (or acidulants), flavor materials, umami seasonings, alcoholic beverages, and the like.

When the acetic acid-containing food or drink of the present invention is a drink or a composition for preparing a drink, the pH thereof is not particularly limited as long as it is an acidic value (less than 7). The pH is generally determined from the viewpoint of the balance between flavor and taste. Although it is not particularly limited, the pH is generally 2.0 or more, preferably 2.2 or more, and more preferably 2.4 or more, and the pH is also generally 4.6 or less, preferably 4.5 or less, and more preferably 4.4 or less.

Examples of saccharides include sugar, maltose, fructose, isomerized liquid sugar, glucose, brown cane sugar, honey, mizuame (syrup), dextrin, lactose, galactose, and sugar alcohols such as sorbitol, maltitol, and xylitol. These saccharides may be used singly or in any combination of two or more at any ratio.

Examples of high-intensity sweeteners include aspartame, acesulfame potassium, sucralose, neotame, licorice extract, stevia, and enzyme-treated products thereof. These high-intensity sweeteners may be used singly or in any combination of two or more at any ratio.

Examples of fruits include, but are not limited to, those derived from apple, peach, grape, acerola, blueberry, pear, apricot, orange, lemon, *Citrus junos, Citrus sphaerocarpa, Citrus sudachi*, lime, mandarin, grapefruit, strawberry, pineapple, banana, melon, kiwifruit, pineapple, cassis, apricot, guava, plum, mango, papaya, lychee, Japanese plum, pomegranate, acai, pink grapefruit, raspberry, white grape, bergamot, passion fruit, *Citrus hassaku*, and the like. These fruits may be used singly or in any combination of two or more at any ratio.

Examples of vegetables include, but are not limited to, those derived from fruit vegetables (e.g., tomato, pepper, bell pepper, cucumber, eggplant, red bell pepper, pumpkin, and green soybean), root vegetables (e.g., onion, ginger, garlic, radish, carrot, and beet), leaf vegetables (e.g., cabbage, lettuce, spinach, Chinese cabbage, celery, komatsuna (Japanese mustard spinach), bok choy, mulukhiyah, kale, perilla, Chinese chive, parsley, and Welsh onion), stem vegetables (e.g., garlic, asparagus, and bamboo shoot), flower vegetables (e.g., broccoli and cauliflower), mushrooms, and the like. These vegetables may be used singly or in any combination of two or more at any ratio. Squeezed juices (fruit juices and vegetable juices), purees, pastes, and the like, obtained from these vegetables and fruits may be used singly or in any combination of two or more at any ratio in the drink of the present invention.

Examples of flavors include grape flavors, apple flavors, lemon flavors, orange flavors, grapefruit flavors, *Citrus junos* flavors, *Citrus sudachi* flavors, blueberry flavors, Japanese plum flavors, cassis flavors, pomegranate flavors, raspberry flavors, milk flavors such as yogurt flavors, rose hip flavors, chamomile flavors, jasmine flavors, ginger flavors, garlic flavors, mustard flavors, onion flavors, sesame flavors, Welsh onion flavors, Chinese chive flavors, perilla flavors, wasabi flavors, and the like. These flavors may be used singly or in any combination of two or more at any ratio.

Examples of vinegars include brewed vinegars, which are produced from grains such as rice or wheat or from fruit juice, and synthetic vinegars, which are produced by adding sugar or other seasonings to a diluted solution of glacial acetic acid or acetic acid or adding brewed vinegar thereto, any of which may be used. Examples of brewed vinegars include rice vinegar, grain vinegar (e.g., brown rice vinegar, black vinegar, sake lees vinegar, malt vinegar, adlay vinegar, and soybean vinegar), fruit vinegar (e.g., cider vinegar, grape vinegar, lemon vinegar, *Citrus sphaerocarpa* vinegar, plum vinegar, wine vinegar, and balsamic vinegar), alcoholic vinegar produced by acetic acid fermentation using ethanol as a raw material Chinese vinegar, sherry vinegar, and the like. Examples of synthetic vinegars include glacial acetic acid or acetic acid diluted with water as appropriate. These vinegars may be used singly or in a combination of two or more.

Salts may be used as is or may be a food containing salt. Examples of foods containing salt include, but are not limited to, soy sauce, miso (fermented soybean paste), soup stock, and the like.

Examples of soy sauces include, but are not limited to, koikuchi (dark-colored) soy sauce, usukuchi (light-colored) soy sauce, white soy sauce, tamari (thick) soy sauce, saishikomi (refermented) soy sauce, and the like. These soy sauces may be used singly or in any combination of two or more at any ratio.

Examples of misos include, but are not limited to, barley miso, rice miso, bean miso, mixed miso, as well as dark-brown miso, white miso, light-colored miso, etc., named according to the difference in color caused by the production method therefor. These misos may be used singly or in any combination of two or more at any ratio.

Examples of amino acid-based seasonings include sodium L-glutamate, DL-alanine, glycine, L- or DL-tryptophan, L-phenylalanine, L- or DL-methionine, L-lysine, L-aspartic acid, sodium L-aspartate, L-arginine, and the like. These amino acid-based seasonings may be used singly or in any combination of two or more at any ratio.

Examples of nucleic acid-based seasonings include disodium 5'-inosinate, disodium 5'-guanylate, disodium 5'-uridylate, disodium 5'-cytidylate, calcium 5'-ribonucleotide, disodium 5'-ribonucleotide, and the like. These nucleic acid-based seasonings may be used singly or in any combination of two or more at any ratio.

Examples of organic acid-based seasonings include calcium citrate, trisodium citrate, potassium gluconate, sodium gluconate, succinic acid, monosodium succinate, disodium succinate, sodium acetate, potassium DL-bitartrate, potassium L-bitartrate, sodium DL-tartrate, sodium L-tartrate, potassium lactate, calcium lactate, sodium lactate, monosodium fumarate, sodium DL-malate, and the like. These organic acid-based seasonings may be used singly or in any combination of two or more at any ratio. Use of two or more organic acid-based seasonings is preferable, because the tastes of the seasonings are enhanced synergistically.

Examples of acidulants include lactic acid, malic acid, citric acid, gluconic acid, succinic acid, tartaric acid, phytic acid, fumaric acid, phosphoric acid, and the like. These acidulants may be used singly or in any combination of two or more at any ratio.

Examples of flavor materials include soup stock made from bonito, soup stock made from kelp, vegetable extract, bonito extract, kelp extract, seafood extract, meat extract, and the like. These flavor materials may be used singly or in any combination of two or more at any ratio.

Examples of umami seasonings include protein hydrolysates, yeast extracts, and the like. These umami seasonings may be used singly or in any combination of two or more at any ratio.

Examples of alcoholic beverages include sake, synthetic sake, mirin (sweet cooking rice wine), shochu (Japanese distilled liquor), wine, liqueur, Shaoxing rice wine, and the like. These alcoholic beverages may be used singly or in any combination of two or more at any ratio.

Examples of fats and oils include soybean oil, soybean germ oil, rapeseed oil, corn oil, sesame oil, perilla oil, linseed oil, peanut oil, safflower oil, high oleic safflower oil, sunflower oil, cottonseed oil, grape seed oil, macadamia nut oil, hazelnut oil, pumpkin seed oil, walnut oil, *camellia* oil, *Camellia sinensis* seed oil, perilla oil, olive oil, rice-bran oil, wheat germ oil, palm oil, alga oil, and the like. These fats and oils may be used singly or in any combination of two or more at any ratio.

Spicy seasonings refer to plant parts (e.g., fruits, pericarps, flowers, buds, barks, stems, leaves, seeds, roots, rhizomes, or the like of plants) that have specific aromas, pungent tastes, and/or color tones, and are added to foods or drinks for the purpose of flavoring, deodorizing, seasoning, coloring, or the like. Spicy seasonings include spices and herbs. Spices refer to spicy seasonings derived from plant parts other than stems, leaves, and flowers. Examples of spices include pepper (black pepper, white pepper, and red pepper), garlic, ginger, sesame (sesame seed), chili pepper, horseradish, mustard, poppy seed, *Citrus junos*, nutmeg, cinnamon, paprika, cardamom, cumin, saffron, allspice, clove, sansho (Japanese pepper), orange peel, fennel, licorice, fenugreek, dill seed, Sichuan pepper, long pepper, olive fruit, and the like. Herbs refer to spicy seasonings derived from stems, leaves, or flowers. Examples of herbs include watercress, coriander, perilla, celery, tarragon, chive, chervil, sage, thyme, laurel, Chinese chive, parsley, mustard green. (leaf mustard), myoga (Japanese ginger), mugwort, basil, oregano, rosemary, peppermint, savory, lemongrass, dill, wasabi leaf, sansho (Japanese pepper) leaf, and the like.

Spicy seasoning extracts may be any extracts of foods generally labeled as "spicy seasonings" or "spices." Examples of spicy seasoning extracts include chili pepper extract, mustard extract, ginger extract, wasabi extract, pepper extract, garlic extract, onion extract, sansho (Japanese pepper) extract, and the like. These spicy seasoning extracts may be used singly or in any combination of two or more at any ratio.

Examples of flavoring oils include ginger oil, garlic oil, mustard oil, onion oil, sesame oil, Welsh onion oil, Chinese chive oil, seri (Japanese parsley) oil, perilla oil, wasabi oil, lemon oil, *Citrus junos* oil, seafood oil, meat oil, and the like. These flavoring oils may be used singly or in any combination of two or more at any ratio.

Examples of viscosity adjusters include xanthan gum, guar gum, gellan gum, gum arabic, tamarind seed gum, tara gum, gum tragacanth, pectin, cellulose, carrageenan, agar, starch, alginic acid, sodium alginate, karaya gum, pullulan, chitin, chitosan, and the like. These viscosity adjusters may be used singly or in any combination of two or more at any ratio.

Examples of ingredients include vegetables (e.g., carrot, burdock, and radish), grains (e.g., adzuki bean and soybean), meat, fishes, and the like. These ingredients may be used singly or in any combination of two or more at any ratio.

The acetic acid-containing food or drink of the present invention can be produced by a method comprising incorporating acetic acid at a concentration of 0.02 w/v % or more and incorporating at least one member selected from the group consisting of butyl propionate (component a) and isoamyl acetate (component b). Thus, in one embodiment, the present invention relates to a method for producing an acetic acid-containing food or drink with reduced acid odor and/or pungent odor (sometimes referred to herein as the "production method of the present invention"), including the above method.

Further, in one embodiment, the present invention relates to a method for suppressing acetic acid odor and/or pungent odor of an acetic acid-containing food or drink, the method comprising incorporating at least one member selected from the group consisting of butyl propionate (component a) and isoamyl acetate (component b) into an acetic acid-containing food or drink (sometimes referred to herein as the "method of the present invention").

The timing of incorporating acetic acid, components a and b, and other components optionally added (component c, component d, etc.) is not particularly limited. Examples of the timing include during production of a food or drink; after production of a food or drink; before eating or drinking; and the like. The origin of the acetic acid, component a, component b, component c, component d, etc. are not particularly limited as long as they are derived from sources suitable for foods or drinks. These components are derived from, for example, flavors or other formulations, food additives, seasonings, food ingredients, or the like. After acetic acid, components a and b, and other components optionally added are incorporated, the resulting mixture is preferably mixed as needed to disperse the components as uniformly as possible in the food or drink.

Further, the present invention can provide a composition for suppressing acetic acid odor and/or pungent odor of an acetic acid-containing food or drink, the composition comprising at least one member selected from the group consisting of butyl propionate (component a) and isoamyl acetate (component b) (sometimes referred to herein as the "composition of the present invention"). In one embodiment, the total amount of components a and b in the composition of the present invention is, for example, 1 to 100 mass %, 20 to 100 mass %, 40 to 100 mass %, 60 to 100 mass %, 80 to 100 mass %, 90 to 100 mass %, 95 to 100 mass %, 99 to 100 mass %, or 99.9 to 100 mass %, based on 100 mass % of the composition of the present invention.

The properties and state of the composition of the present invention are not particularly limited. The composition of the present invention may be, for example, in the form of a solid (e.g., powder), a semisolid, or a liquid. The composition of the present invention can be used, for example, as a food or drink or a food additive. Examples of the food or drink include foods and drinks mentioned above as examples. The food additive may contain other components. The food additive as referred to herein is used in a food production process by, for example, adding to, mixing with, or infiltrating with foods. Said other components are not particularly limited as long as they can be added to foods. Examples include carriers and additives that can be added to foods. Examples of such carriers include excipients, binders, disintegrating agents, disintegrating aids, lubricants, wetting agents, and the like. The form of the food additive includes, but is not limited to, granules, powders, tablets, pills, capsules (including hard capsules and soft capsules), and the like. The composition of the present invention can suppress acid odor and/or pungent odor of an acetic acid-containing food or drink by incorporating into the food or drink.

In the production method of the present invention, the method of the present invention, and the composition of the present invention, component c and/or component d can be further used as in the acetic acid-containing food or drink of the present invention. This can suppress acetic acid odor and/or pungent odor, and/or enhance body sensation.

EXAMPLES

The present invention is described in detail below with reference to Examples. However, the present invention is not limited thereto.

Test Example 1: Flavor Evaluation Test 1

First, diluted solutions of the components to be evaluated were prepared. The following components a, b, c, and d were individually added to a 70% aqueous ethanol solution and stirred well to prepare solutions at a concentration of 10,000 ppm.

Component a: butyl propionate (reagent name: Propanoic acid, butyl ester, produced by Tokyo Chemical Industry Co., Ltd., grade: special grade, purity: 99% or higher, CAS No.: 590-01-2).

Component b: isoamyl acetate (reagent name: 1-Butanol, 3-methyl-,acetate, produced by Sigma-Aldrich Japan G.K., grade: special grade, purity: 98% or higher, CAS No.: 123-92-2).

Component c: 2-butanone (reagent name: 2-Butanone, produced by Tokyo Chemical Industry Co., Ltd., grade: for absorption spectrophotometry, purity: 99% or higher, CAS No.: 78-93-3).

Component d: 3-methylbutanal (reagent name: Butanal, 3-methyl-, produced by Tokyo Kasei Kogyo Co., Ltd., grade: special grade, purity: 98% or higher, CAS No.: 590-86-3).

The obtained solutions were diluted with ion-exchange water to prepare 1000 ppm solutions and 100 ppm solutions.

Subsequently, as various components, acetic acid (produced by Kanto Chemical Co., Ltd., grade: special grade, purity: 99.7% or higher), ethyl acetate (produced by Kanto Chemical Co., Ltd., grade: special grade, purity: 99.5% or higher), and acetaldehyde (Fuji Film Wako Pure Chemical Co., Ltd., grade: first grade, purity: 88.0% or higher) were individually added to ion-exchange water and stirred well to prepare 15% solutions and 1% solutions.

Subsequently, the diluted solutions of the components to be evaluated were added thereto and the resulting mixtures were stirred well to prepare test solutions having the formulations and concentrations shown in Tables 1 to 6 (Examples 1 to 57).

On the other hand, controls having the same formulations as in Examples 1 to 57 except that the component to be evaluated was not contained (control test solutions) were prepared. Before the evaluation, acetic acid odor and pungent odor were confirmed to be detected even from the controls having low concentrations of acetic acid, ethyl acetate, and acetaldehyde (control A containing 0.02 w/v % acetic acid, 0.1 ppm ethyl acetate, and 0.01 ppm acetaldehyde and control B containing 0.2 w/v % acetic acid, 5 ppm ethyl acetate, and 3 ppm acetaldehyde).

The test solutions and controls were evaluated for their acetic acid odor, pungent odor (ethyl acetate odor and acetaldehyde odor), and body sensation (less watery taste, and deep and rich taste) by 10 expert panelists whose ability to judge taste and smell had been proven in certain tests. The certain tests on taste and smell were the identification tests described below in 1) and 2). Persons who particularly performed well in the identification tests were defined as expert panelists. The panelists compared each test solution to a corresponding control solution having the same formulation as the test solution, except that the control solution did not contain the component to be evaluated. The panelists scored each test solution based on the comparison according to the following evaluation criteria, and the average score was calculated.

Identification Test 1): a taste identification test in which aqueous solutions of five taste components (sweet taste: taste of sugar, sour taste: taste of tartaric acid, umami taste: taste of sodium glutamate, salty taste: taste of sodium chloride, and bitter taste: taste of caffeine) at a concentration close to each component's threshold are prepared, and whether the five taste samples can be accurately identified from a total of seven samples including two distilled water samples in addition to the solutions of five taste components is tested.

Identification Test 2): a concentration difference identification test in which five aqueous saline solutions and five aqueous acetic acid solutions each having slightly different concentrations are prepared, and whether their slight concentration difference can be accurately identified is tested.

The evaluation was performed in the following manner. 10 ml of a test solution or a control was placed in a sensory testing glass tinted so that the color of the contents was invisible. The glass was then covered with a lid, such as a petri dish. After the glass was turned around several times in this state, the lid was opened and odor was smelled to evaluate acetic acid odor and pungent odor. Further, the test solution or control was placed in the mouth and evaluated for body sensation. Once the smell disappeared from the nasal cavity, the next sample evaluation was performed. After a test solution was placed in the mouth, distilled water was placed in the mouth to thoroughly eliminate the flavor in the mouth. The next sample evaluation was then performed.

Acetic Acid Odor Evaluation Criteria

1: Increased acetic acid odor as compared to the control.

2: Slightly increased acetic acid odor as compared to the control.

3: The same level of acetic acid odor as the control.

4: Slightly weak acetic acid odor as compared to the control.

5: Weak acetic acid odor as compared to the control.

Pungent Odor Evaluation Criteria

1: Increased pungent odor as compared to the control.

2: Slightly increased pungent odor as compared to the control.

3: Same level of pungent odor as the control.

4: Slightly weak pungent odor as compared to the control.

5: Weak pungent odor as compared to the control.

Body Sensation Evaluation Criteria

1: Weaker body sensation and much more watery taste than the control.

2: Slightly weaker body sensation and slightly more watery taste than the control.

3: Same level as the control.

4: Slightly stronger body sensation and slightly less watery taste than the control.

5: Stronger body sensation and less watery taste than the control.

Further, the overall evaluation was conducted based on the average score of the evaluation items described above according to the following evaluation criteria.

Overall Evaluation

A: The average score of all items is 4.5 or more.

B: The average score of all items is 4 or more and less than 4.5.

C: The average score of all items is 3 or more and less than 4.

D: The average score of all items is less than 3.

Tables 1 to 6 show the results.

TABLE 1

| Example No. | | 1 | 2 | 3 | 4 | 5 | 6 | 7 | 8 | 9 | 10 |
|---|---|---|---|---|---|---|---|---|---|---|---|
| Acetic acid | w/v % | 0.2 | 0.02 | 0.2 | 1.5 | 1.5 | 1.5 | 1.5 | 12 | 12 | 4.5 |
| Ethyl acetate | ppm | 5 | 0.1 | 500 | 500 | 1000 | 1000 | 20000 | 20000 | 20000 | 1000 |
| Acetaldehyde | ppm | 3 | 0.01 | 300 | 300 | 1000 | 1000 | 10000 | 10000 | 10000 | 1000 |
| a: Butyl propionate | ppb | 0.02 | 0.05 | 0.05 | 0.1 | 0.5 | 3 | 3 | 3 | 0.8 | 5 |
| b: Isoamyl acetate | ppb | 0 | 0 | 0 | 0 | 0 | 0 | 0 | 0 | 0 | 0 |
| c: 2-Butanone | ppb | 0 | 0 | 0 | 0 | 0 | 0 | 0 | 0 | 0 | 0 |
| d: 3-Methylbutanal | ppb | 0 | 0 | 0 | 0 | 0 | 0 | 0 | 0 | 0 | 0 |
| Total content of components a and b | ppb | 0.02 | 0.05 | 0.05 | 0.1 | 0.5 | 3 | 3 | 3 | 0.8 | 5 |
| Total content of components a to d | ppb | 0.02 | 0.05 | 0.05 | 0.1 | 0.5 | 3 | 3 | 3 | 0.8 | 5 |
| Acetic acid/Total content of components a and b | w/v %/ppb | 10 | 0.4 | 4 | 15 | 3 | 0.5 | 0.5 | 4 | 15 | 0.9 |
| Acetic acid/Total content of components a to d | w/v %/ppb | 10 | 0.4 | 4 | 15 | 3 | 0.5 | 0.5 | 4 | 15 | 0.9 |
| Ethyl acetate/Total content of components a and b | ppm/ppb | 250 | 2 | 10000 | 5000 | 2000 | 333 | 6667 | 6667 | 25000 | 200 |
| Ethyl acetate/Total content of components a to d | ppm/ppb | 250 | 2 | 10000 | 5000 | 2000 | 333 | 6667 | 6667 | 25000 | 200 |

TABLE 1-continued

| Example No. | | 1 | 2 | 3 | 4 | 5 | 6 | 7 | 8 | 9 | 10 |
|---|---|---|---|---|---|---|---|---|---|---|---|
| Acetaldehyde/Total content of components a and b | ppm/ppb | 150 | 0.2 | 6000 | 3000 | 2000 | 333 | 3333 | 3333 | 12500 | 200 |
| Acetaldehyde/Total content of components a to d | ppm/ppb | 150 | 0.2 | 6000 | 3000 | 2000 | 333 | 3333 | 3333 | 12500 | 200 |
| Sensory evaluation (average) | Body sensation | 3.2 | 3.8 | 3.9 | 3.8 | 4.1 | 4.2 | 4.3 | 4.2 | 4.1 | 4.3 |
| | Acetic acid odor | 3.1 | 3.6 | 3.5 | 3.3 | 3.9 | 3.9 | 3.9 | 3.9 | 3.9 | 3.9 |
| | Pungent odor | 3.2 | 3.8 | 3.5 | 3.8 | 4.1 | 4.0 | 4.1 | 4.0 | 4.1 | 4.0 |
| | Average | 3.2 | 3.7 | 3.6 | 3.6 | 4.0 | 4.0 | 4.1 | 4.0 | 4.0 | 4.1 |
| Total evaluation | | C | C | C | C | B | B | B | B | B | B |

15

TABLE 2

| Example No. | | 11 | 12 | 13 | 14 | 15 | 16 | 17 | 18 | 19 | 20 |
|---|---|---|---|---|---|---|---|---|---|---|---|
| Acetic acid | w/v % | 10.5 | 10.5 | 0.2 | 12 | 12 | 0.2 | 0.02 | 1.5 | 1.5 | 1.5 |
| Ethyl acetate | ppm | 20000 | 20000 | 1 | 20000 | 20000 | 5 | 0.1 | 500 | 1000 | 1000 |
| Acetaldehyde | ppm | 10000 | 10000 | 1 | 10000 | 10000 | 3 | 0.01 | 300 | 1000 | 1000 |
| a: Butyl propionate | ppb | 500 | 5000 | 5000 | 50000 | 100000 | 0 | 0 | 0 | 0 | 0 |
| b: Isoamyl acetate | ppb | 0 | 0 | 5000 | 0 | 0 | 0.002 | 0.005 | 0.1 | 0.5 | 80 |
| c: 2-Butanone | ppb | 0 | 0 | 0 | 0 | 0 | 0 | 0 | 0 | 0 | 0 |
| d: 3-Methylbutanal | ppb | 0 | 0 | 0 | 0 | 0 | 0 | 0 | 0 | 0 | 0 |
| Total content of components a and b | ppb | 500 | 5000 | 10000 | 50000 | 100000 | 0.002 | 0.005 | 0.1 | 0.5 | 80 |
| Total content of components a to d | ppb | 500 | 5000 | 10000 | 50000 | 100000 | 0.002 | 0.005 | 0.1 | 0.5 | 80 |
| Acetic acid/Total content of components a and b | w/v %/ppb | 0.021 | 0.0021 | 0.00002 | 0.00024 | 0.00012 | 100 | 4 | 15 | 3 | 0.019 |
| Acetic acid/Total content of components a to d | w/v %/ppb | 0.021 | 0.0021 | 0.00002 | 0.00024 | 0.00012 | 100 | 4 | 15 | 3 | 0.019 |
| Ethyl acetate/Total content of components a and b | ppm/ppb | 40 | 4 | 0.0001 | 0.4 | 0.2 | 2500 | 20 | 5000 | 2000 | 12.5 |
| Ethyl acetate/Total content of components a to d | ppm/ppb | 40 | 4 | 0.0001 | 0.4 | 0.2 | 2500 | 20 | 5000 | 2000 | 12.5 |
| Acetaldehyde/Total content of components a and b | ppm/ppb | 20 | 2 | 0.0001 | 0.2 | 0.1 | 1500 | 2 | 3000 | 2000 | 12.5 |
| Acetaldehyde/Total content of components a to d | ppm/ppb | 20 | 2 | 0.0001 | 0.2 | 0.1 | 1500 | 2 | 3000 | 2000 | 12.5 |
| Sensory evaluation (average) | Body sensation | 4.3 | 4.4 | 4.8 | 4.5 | 4.6 | 3.2 | 3.8 | 3.9 | 4.0 | 4.2 |
| | Acetic acid odor | 3.9 | 4.1 | 3.6 | 4.2 | 4.1 | 3.3 | 3.8 | 3.9 | 4.1 | 4.0 |
| | Pungent odor | 4.2 | 4.2 | 4.0 | 4.2 | 4.1 | 3.0 | 3.5 | 3.4 | 3.9 | 4.1 |
| | Average | 4.1 | 4.2 | 4.1 | 4.3 | 4.3 | 3.2 | 3.7 | 3.7 | 4.0 | 4.1 |
| Total evaluation | | B | B | B | B | B | C | C | C | B | B |

TABLE 3

| Example No. | | 21 | 22 | 23 | 24 | 25 | 26 | 27 | 28 | 29 | 30 |
|---|---|---|---|---|---|---|---|---|---|---|---|
| Acetic acid | w/v % | 1.50 | 12 | 12 | 4.5 | 10.5 | 10.5 | 12 | 12 | 0.02 | 1.5 |
| Ethyl acetate | ppm | 20000 | 20000 | 20000 | 1000 | 20000 | 20000 | 20000 | 20000 | 0.1 | 500 |
| Acetaldehyde | ppm | 10000 | 10000 | 10000 | 1000 | 10000 | 10000 | 10000 | 10000 | 0.01 | 300 |
| a: Butyl propionate | ppb | 0 | 0 | 0 | 0 | 0 | 0 | 0 | 0 | 0.05 | 0.05 |
| b: Isoamyl acetate | ppb | 80 | 80 | 40 | 150 | 1000 | 10000 | 20000 | 50000 | 0.005 | 0.05 |
| c: 2-Butanone | ppb | 0 | 0 | 0 | 0 | 0 | 0 | 0 | 0 | 0 | 0 |
| d: 3-Methylbutanal | ppb | 0 | 0 | 0 | 0 | 0 | 0 | 0 | 0 | 0 | 0 |
| Total content of components a and b | ppb | 80 | 80 | 40 | 150 | 1000 | 10000 | 20000 | 50000 | 0.055 | 0.1 |
| Total content of components a to d | ppb | 80 | 80 | 40 | 150 | 1000 | 10000 | 20000 | 50000 | 0.055 | 0.1 |

TABLE 3-continued

| Example No. | | 21 | 22 | 23 | 24 | 25 | 26 | 27 | 28 | 29 | 30 |
|---|---|---|---|---|---|---|---|---|---|---|---|
| Acetic acid/Total content of components a and b | w/v %/ppb | 0.019 | 0.15 | 0.3 | 0.03 | 0.011 | 0.0011 | 0.0006 | 0.00024 | 0.36 | 15 |
| Acetic acid/Total content of components a to d | w/v %/ppb | 0.019 | 0.15 | 0.3 | 0.03 | 0.011 | 0.0011 | 0.0006 | 0.00024 | 0.36 | 15 |
| Ethyl acetate/Total content of components a and b | ppm/ppb | 250 | 250 | 500 | 6.67 | 20 | 2 | 1 | 0.4 | 1.82 | 5000 |
| Ethyl acetate/Total content of components a to d | ppm/ppb | 250 | 250 | 500 | 6.67 | 20 | 2 | 1 | 0.4 | 1.82 | 5000 |
| Acetaldehyde/Total content of components a and b | ppm/ppb | 125 | 125 | 250 | 6.67 | 10 | 1 | 0.5 | 0.2 | 0.18 | 3000 |
| Acetaldehyde/Total content of components a to d | ppm/ppb | 125 | 125 | 250 | 6.67 | 10 | 1 | 0.5 | 0.2 | 0.18 | 3000 |
| Sensory evaluation (average) | Body sensation | 4.3 | 4.2 | 4.1 | 4.2 | 4.2 | 4.3 | 4.2 | 4.4 | 4.5 | 4.4 |
|  | Acetic acid odor | 3.9 | 3.8 | 4.1 | 4.2 | 4.0 | 4.2 | 4.1 | 4.0 | 4.2 | 4.4 |
|  | Pungent odor | 3.9 | 4.0 | 3.9 | 3.8 | 3.9 | 3.8 | 4.0 | 3.9 | 4.2 | 4.3 |
|  | Average | 4.0 | 4.0 | 4.0 | 4.1 | 4.0 | 4.1 | 4.1 | 4.1 | 4.3 | 4.4 |
| Total evaluation | | B | B | B | B | B | B | B | B | B | B |

TABLE 4

| Example No. | | 31 | 32 | 33 | 34 | 35 | 36 | 37 | 38 | 39 | 40 |
|---|---|---|---|---|---|---|---|---|---|---|---|
| Acetic acid | w/v % | 4.5 | 10.5 | 12 | 12 | 1.5 | 3 | 4.5 | 10.5 | 10.5 | 1.5 |
| Ethyl acetate | ppm | 10000 | 20000 | 20000 | 20000 | 500 | 5000 | 1000 | 20000 | 10000 | 1000 |
| Acetaldehyde | ppm | 10000 | 10000 | 10000 | 10000 | 300 | 3000 | 1000 | 10000 | 5000 | 1000 |
| a: Butyl propionate | ppb | 2.5 | 200 | 25000 | 50000 | 1 | 10 | 5 | 500 | 5000 | 0 |
| b: Isoamyl acetate | ppb | 75 | 50 | 10000 | 25000 | 0 | 0 | 0 | 0 | 0 | 0.5 |
| c: 2-Butanone | ppb | 0 | 0 | 0 | 0 | 0.01 | 0.5 | 5 | 100 | 1000 | 0.01 |
| d: 3-Methylbutanal | ppb | 0 | 0 | 0 | 0 | 0 | 0 | 0 | 0 | 0 | 0 |
| Total content of components a and b | ppb | 77.5 | 250 | 35000 | 75000 | 1 | 10 | 5 | 500 | 5000 | 0.5 |
| Total content of components a to d | ppb | 77.5 | 250 | 35000 | 75000 | 1.01 | 10.5 | 10 | 600 | 6000 | 0.51 |
| Acetic acid/Total content of components a and b | w/v %/ppb | 0.058 | 0.042 | 0.00034 | 0.00016 | 1.5 | 0.3 | 0.9 | 0.021 | 0.0021 | 3 |
| Acetic acid/Total content of components a to d | w/v %/ppb | 0.058 | 0.042 | 0.00034 | 0.00016 | 1.49 | 0.29 | 0.45 | 0.018 | 0.0018 | 2.94 |
| Ethyl acetate/Total content of components a and b | ppm/ppb | 129 | 80 | 0.57 | 0.27 | 500 | 500 | 200 | 40 | 2 | 2000 |
| Ethyl acetate/Total content of components a to d | ppm/ppb | 129 | 80 | 0.57 | 0.27 | 495 | 476 | 100 | 33 | 1.67 | 1961 |
| Acetaldehyde/Total content of components a and b | ppm/ppb | 129 | 40 | 0.29 | 0.13 | 300 | 300 | 200 | 20 | 1 | 2000 |
| Acetaldehyde/Total content of components a to d | ppm/ppb | 129 | 40 | 0.29 | 0.13 | 297 | 286 | 100 | 17 | 0.83 | 1961 |
| Sensory evaluation (average) | Body sensation | 4.5 | 4.6 | 4.5 | 4.6 | 4.2 | 4.5 | 4.6 | 4.7 | 4.6 | 4.2 |
|  | Acetic acid odor | 4.3 | 4.2 | 4.2 | 4.2 | 4.1 | 4.3 | 4.2 | 4.3 | 4.2 | 4.1 |
|  | Pungent odor | 4.3 | 4.3 | 4.3 | 4.3 | 4.2 | 4.5 | 4.5 | 4.4 | 4.5 | 4.2 |
|  | Average | 4.4 | 4.4 | 4.3 | 4.4 | 4.2 | 4.4 | 4.4 | 4.5 | 4.4 | 4.2 |
| Total evaluation | | B | B | B | B | B | B | B | A | B | B |

TABLE 5

| Example No. | | 41 | 42 | 43 | 44 | 45 | 46 | 47 | 48 | 49 | 50 |
|---|---|---|---|---|---|---|---|---|---|---|---|
| Acetic acid | w/v % | 1.5 | 10.5 | 12 | 3 | 1.5 | 1.5 | 10.5 | 10.5 | 0.5 | 3 |
| Ethyl acetate | ppm | 20000 | 20000 | 10000 | 20000 | 500 | 20000 | 20000 | 20000 | 1000 | 20000 |
| Acetaldehyde | ppm | 10000 | 10000 | 10000 | 10000 | 300 | 10000 | 10000 | 10000 | 500 | 10000 |
| a: Butyl propionate | ppb | 0 | 0 | 0 | 0 | 1 | 3 | 500 | 500 | 0 | 0 |
| b: Isoamyl acetate | ppb | 80 | 1000 | 100 | 100 | 0 | 0 | 0 | 0 | 0.5 | 80 |
| c: 2-Butanone | ppb | 0.5 | 100 | 5000 | 10000 | 0 | 0 | 0 | 0 | 0 | 0 |
| d: 3-Methylbutanal | ppb | 0 | 0 | 0 | 0 | 0.01 | 0.1 | 100 | 10000 | 0.01 | 0.1 |
| Total content of components a and b | ppb | 80 | 1000 | 100 | 100 | 1 | 3 | 500 | 500 | 0.5 | 80 |
| Total content of components a and d | ppb | 80.5 | 1100 | 5100 | 10100 | 1.01 | 3.1 | 600 | 10500 | 0.51 | 80.1 |
| Acetic acid/Total content of components a and b | w/v %/ppb | 0.019 | 0.011 | 0.12 | 0.03 | 1.5 | 0.5 | 0.021 | 0.021 | 1 | 0.038 |
| Acetic acid/Total content of components a to d | w/v %/ppb | 0.019 | 0.0095 | 0.0024 | 0.0003 | 1.49 | 0.48 | 0.018 | 0.001 | 0.98 | 0.037 |
| Ethyl acetate/Total content of component a and b | ppm/ppb | 250 | 20 | 100 | 200 | 500 | 6667 | 40 | 40 | 2000 | 250 |
| Ethyl acetate/Total content of component a to d | ppm/ppb | 248 | 18 | 1.96 | 1.98 | 495 | 6452 | 33 | 1.9 | 1961 | 250 |
| Acetaldehyde/Total content of component a and b | ppm/ppb | 125 | 10 | 100 | 100 | 300 | 3333 | 20 | 20 | 1000 | 125 |
| Acetaldehyde/Total content of component a to d | ppm/ppb | 124 | 9.1 | 1.96 | 0.99 | 297 | 3226 | 17 | 0.95 | 980 | 125 |
| Sensory evaluation (average) | Body sensation | 4.6 | 4.7 | 4.7 | 4.7 | 4.2 | 4.7 | 4.6 | 4.7 | 4.0 | 4.4 |
| | Acetic acid odor | 4.3 | 4.2 | 4.3 | 4.4 | 4.3 | 4.4 | 4.3 | 4.4 | 4.4 | 4.4 |
| | Pungent odor | 4.4 | 4.5 | 4.4 | 4.5 | 4.1 | 4.3 | 4.3 | 4.3 | 4.0 | 4.2 |
| | Average | 4.4 | 4.4 | 4.5 | 4.5 | 4.2 | 4.5 | 4.4 | 4.5 | 4.1 | 4.3 |
| Total evaluation | | B | B | A | A | B | A | B | A | B | B |

TABLE 6

| Example No. | | 51 | 52 | 53 | 54 | 55 | 56 | 57 |
|---|---|---|---|---|---|---|---|---|
| Acetic acid | w/v % | 10.5 | 12 | 0.3 | 0.3 | 10.5 | 1.5 | 4.5 |
| Ethyl acetate | ppm | 20000 | 10000 | 50 | 50 | 20000 | 5000 | 20000 |
| Acetaldehyde | ppm | 10000 | 10000 | 20 | 20 | 10000 | 1000 | 10000 |
| a: Butyl propionate | ppb | 0 | 0 | 1 | 1 | 100 | 0.8 | 2 |
| b: Isoamyl acetate | ppb | 40 | 50 | 80 | 80 | 100 | 40 | 80 |
| c: 2-Butanone | ppb | 0 | 0 | 5 | 5 | 50 | 5 | 0 |
| d: 3-Methylbutanal | ppb | 50 | 5000 | 1 | 50 | 30 | 0 | 1 |
| Total content of components a and b | ppb | 40 | 50 | 81 | 81 | 200 | 40.8 | 82 |
| Total content of components a to d | ppb | 90 | 5050 | 87 | 136 | 280 | 45.8 | 83 |
| Acetic acid/Total content of components a and b | w/v %/ppb | 0.26 | 0.24 | 0.0037 | 0.0037 | 0.053 | 0.037 | 0.055 |
| Acetic acid/Total content of components a to d | w/v %/ppb | 0.12 | 0.0024 | 0.0034 | 0.0022 | 0.038 | 0.033 | 0.054 |
| Ethyl acetate/Total content of components a and b | ppm/ppb | 500 | 200 | 0.62 | 0.62 | 100 | 123 | 244 |
| Ethyl acetate/Total content of components a to d | ppm/ppb | 222 | 1.98 | 0.57 | 0.37 | 71 | 109 | 241 |
| Acetaldehyde/Total content of components a and b | ppm/ppb | 250 | 200 | 0.25 | 0.25 | 50 | 25 | 122 |
| Acetaldehyde/Total content of components a to d | ppm/ppb | 111 | 1.98 | 0.23 | 0.15 | 36 | 22 | 120 |
| Sensory evaluation (average) | Body sensation | 4.5 | 4.5 | 4.7 | 4.8 | 4.9 | 4.7 | 4.7 |
| | Acetic acid odor | 4.5 | 4.5 | 4.9 | 4.8 | 4.8 | 4.7 | 4.8 |
| | Pungent odor | 4.3 | 4.2 | 4.8 | 4.9 | 4.9 | 4.8 | 4.7 |
| | Average | 4.4 | 4.4 | 4.8 | 4.8 | 4.9 | 4.7 | 4.7 |
| Total evaluation | | B | B | A | A | A | A | A |

Tables 1 to 6 show that the use of at least one member selected from the group consisting of components a and b can suppress acetic acid odor and/or pungent odor and improve the body sensation, and that these effects can be further (in some cases, significantly) enhanced by adjusting the content of components a and b and/or the ratio of components a and b to various other components (e.g., an odor source such as acetic acid, ethyl acetate, or acetaldehyde), or by combining components a and b.

It was also found that further combining at least one member selected from the group consisting of components c and d can suppress acetic acid odor and/or pungent odor and/or enhance body sensation (in particular, suppress acetic acid odor and/or pungent odor), and that these effects can be further (in some cases, significantly) enhanced by adjusting the content of these components or by combining components c and d.

In Example 15, the smell of component a was prominent and slightly out of balance with the fresh smell of acetic acid; whereas in Example 28, the smell of component b was prominent and slightly out of balance with the fresh smell of acetic acid. These results suggest that it is possible to suppress the unpleasantness and/or pungent odor of acetic acid and further enhance the body sensation while maintaining the fresh smell of acetic acid by adjusting the content of components a and b and/or the ratio of these components to acetic acid.

Test Example 2: Flavor Evaluation Test 2

Drinks (Comparative Example 1 and Examples 58 to 71) were prepared by blending ingredients according to the formulations shown in Tables 7 and 8 and appropriately adding acetic acid, ethyl acetate, acetaldehyde, and components a to d (the same components as used in Test Example 1 were used) to achieve the contents shown in Tables 9 and 10. The details of 938 kg of vegetables in Example 67 are as follows: tomato juice 400, carrots 300, celery 55, cabbage 50, bell pepper 50, pumpkin 40, beet 20, green soybean 10, radish 5, ginger 4, and Welsh onion 4.

The contents of acetic acid, ethyl acetate, acetaldehyde, and components a to d in each drink were measured in the following manner.

Acetic Acid Content

Samples were diluted with ultrapure water so that each sample had an acetic acid concentration of around 100 mg %, and the peak area of acetic acid of each sample was analyzed by high-performance liquid chromatography (HPLC) under the following conditions. Further, 100 mg % acetic acid obtained by dilution with ultrapure water was analyzed as a standard sample in the same manner. The acetic acid content of each sample was calculated by the external standard method.

Measuring equipment: high-performance liquid chromatography (Model: LC-10ADVP, produced by Shimadzu Corporation)

Mobile phase (1): 4 mM p-toluenesulfonic acid aqueous solution, flow rate 0.9 mL/min Mobile phase (2): 16 mM Bis-Tris aqueous solution containing 4 mM p-toluenesulfonic acid and 80 μM MEDTA, flow rate 0.9 mL/min Column: Shodex KC810P+KC-811×2 (produced by Showa Denko K.K.)

Column temperature: 50° C.

Detection: Electrical conductivity detector

Ethyl Acetate Content

Samples were diluted with ultrapure water to adjust the concentration of ethyl acetate to around 0.05 to 0.20 v/v %. As an internal standard, acetone (purity: 99.9% or higher, produced by Sigma-Aldrich Japan G.K.) was added to a concentration of 0.25 v/v %. The peak area of ethyl acetate was analyzed by gas chromatography (GC) under the following conditions. A standard sample having a concentration of acetic acid diluted with ultrapure water of 0.25% (v/v) and an acetone concentration of 0.25% (v/v) was analyzed in the same manner. The ethyl acetate content of each sample was calculated by the internal standard method.

Measuring equipment: gas chromatography GC2014, Chromatopac C-R5A (produced by Shimadzu Corporation)

Column: packed column (3.1 m), filler: PEG-1000 25% Shimalite 60/80 BT (produced by Shinwa Chemical Industries Ltd.)

Carrier gas: He gas, gas flow rate 40 ml/min

Temperature conditions: 105° C. (7 min)→temperature rise to at a temperature increment of 100° C./min→120° C. (2 min)

Detector: FID (150° C.)

Acetaldehyde Content

Each sample was subjected to gas chromatography (GC) as is to analyze the peak area of acetaldehyde of the sample under the following conditions. Further, a standard sample containing 100 ppm acetaldehyde (purity: 99.0% or higher, produced by Sigma-Aldrich Japan G.K.) prepared by dilution with ultrapure water was analyzed in the same manner. The acetaldehyde content of each sample was calculated by the external standard method.

Measuring equipment: gas chromatography 6890 (produced by Agilent Technologies)

Column: TC-WAX 0.53 mm×30 m, film thickness 1.0 μm (produced by G.L. Science)

Carrier gas: He gas, gas flow rate: 5 ml/min

Temperature condition: 40° C. (5 min)→temperature increase of 2° C./min→100° C. (0 min)→temperature increase of 20° C./min→230° C. (10 min)

Detector: FID (250° C.)

Contents of Components a to d

[1] Method for Separating and Concentrating Components

The components were separated and concentrated under the following conditions.

After 100 g of a sample was measured into a 1-L vial and the vial was sealed, the sample was preheated at 40° C. for 30 minutes. The vapor phase in the vial was then introduced in an amount of 200 ml as a sample into a concentrator.

Volatile component concentrator: Entech 7200 (produced by Entech Corporation)

Concentration mode: CTD

M1 (Empty) temperature: Trap −40° C.→Desorb 10° C.

M2 (Tenax) temperature: Trap −50° C.→Desorb 220° C.

M3 (CryoFocus) temperature: Trap −150° C.→Desorb 80° C.

[2] Method for Analyzing Components

The peak areas of the components were analyzed by gas chromatography and mass spectrometry under to the following conditions.

Gas Chromatography Conditions

Measuring equipment: Agilent 7980B GC System (produced by Agilent Technologies)

GC column: DB-1 (produced by Agilent Technologies), length 60 m, aperture 0.32 mm, film thickness 1.0 μm Carrier: He gas, gas flow rate: 2.68 mL/min Temperature conditions: maintained at 35° C. (5 min) →increased to 220° C. at a temperature increment of 3° C./min→maintained for 5 minutes Mass Spectrometry Conditions Measuring equipment: Agilent 5977B MSD (produced by Agilent Technologies)

Ionization method: EI

Measurement mode: SCAN

[3] Method for Quantifying Components (the External Standard Method)

Each component (the same component as used in the formulation) of a known concentration diluted with ethanol anhydride was analyzed as a standard sample and a calibration curve was created based on the detected peak area. The analysis results of analyzed samples were fit to the calibration curve to calculate the content of each component.

Brix (Bx: %) of drinks was measured by a known method using a commercially available Brix sugar meter (Model: PR-201a, produced by Atago Corporation). The pH was measured using a pH meter (pH Meter F-51, produced by Horiba Ltd.) at a product temperature of 20° C.

Each drink was evaluated for acetic acid odor, pungent odor (ethyl acetate odor and acetaldehyde odor), and body sensation (less watery taste and thick and rich taste) in the same manner as in Test Example 1 by 10 expert panelists whose ability to judge taste and smell had been proven in certain tests. The panelists scored each drink according to the following evaluation criteria, and the average score was calculated.

More specifically, the evaluation was conducted in the following manner. After 10 ml of each drink was placed in a sensory testing glass tinted so that the color of the contents was invisible, the glass was covered with a lid, such as a petri dish. After the glass was turned around several times in this state, the lid was opened and odor was smelled to evaluate acetic acid odor and pungent odor. Further, each drink was placed in the mouth to evaluate the body sensation. Once the smell disappeared from the nasal cavity, the next sample evaluation was performed. After a drink was placed in the mouth, distilled water was placed in the mouth to thoroughly eliminate the flavor in the mouth. The next sample evaluation was then performed.

Acetic Acid Odor Evaluation Criteria

1: Strong acetic acid odor is sensed.
2: Slightly strong acetic acid odor is sensed.
3: Acetic acid odor is sensed.
4: Slight acetic acid odor is sensed.
5: No acetic acid odor is sensed.

Pungent Odor Evaluation Criteria

1: Strongly pungent odor is sensed.
2: Slightly strong pungent odor is sensed.
3: Pungent odor is sensed.
4: Slight pungent odor is sensed.
5: No pungent odor is sensed.

Body Sensation Evaluation Criteria

1: Weak body sensation and very watery taste.
2: Slightly weak body sensation and strongly watery taste.
3: There is body sensation, but watery taste.
4: Strong body sensation and little watery taste.
5: Very strong body sensation and no watery taste.

Further, the overall evaluation was performed based on the average score of the above evaluation items according to the following evaluation criteria.

Overall Evaluation:

A: The average score of all items is 4.5 or more.
B: The average score of all items is 4 or more and less than 4.5.
C: The average score of all items is 3 or more and less than 4.
D: The average score of all items is less than 3.

Tables 9 and 10 shows the results.

TABLE 7

| | Ingredients | | Comparative Example 1 Apple vinegar drink | Example 58 Apple vinegar drink A | Example 59 Apple vinegar drink B | Example 60 Blueberry vinegar drink | Example 61 Grapefruit vinegar drink | Example 62 Plum vinegar drink | Example 63 Citrus mixed vinegar drink | Example 64 Herb vinegar drink |
|---|---|---|---|---|---|---|---|---|---|---|
| | | | | | | Formulation | | | | |
| Table vinegar | Brewed vinegar (acidity: 15%) | Kg | | | | | | 20 | | |
| | Black vinegar (acidity: 5%) | Kg | 40 | 40 | | | | | 60 | |
| | Apple cider vinegar (acidity: 5%) | Kg | | | 40 | | | | | 30 |
| | Grape vinegar (acidity: 5%) | Kg | | | | 50 | 50 | | | |
| Organic acid | Citric acid | Kg | | | | | | 10 | | |
| | Malic acid | Kg | | | 10 | | | | | |
| | L-Ascorbic acid | Kg | | | | | | | | 10 |
| | Tartaric acid | Kg | | | | | 5 | | | |
| | Sugar | Kg | | | | | | 20 | 10 | |
| | Glucose | Kg | | | | | | 20 | 20 | |
| Sugars | Fructose | Kg | | | | | | 20 | 20 | |
| | Fructose glucose syrup | Kg | | | | | | 20 | | |

TABLE 7-continued

| Ingredients | | | Comparative Example 1 Apple vinegar drink | Example 58 Apple vinegar drink A | Example 59 Apple vinegar drink B | Example 60 Blueberry vinegar drink | Example 61 Grapefruit vinegar drink | Example 62 Plum vinegar drink | Example 63 Citrus mixed vinegar drink | Example 64 Herb vinegar drink |
|---|---|---|---|---|---|---|---|---|---|---|
| | | | | | | Formulation | | | | |
| | Mizuame (syrup) | Kg | | | | | | | | 20 |
| | Brown cane sugar | Kg | | | 30 | | | | 10 | |
| | Honey | Kg | | | 30 | | | 20 | | |
| Sweeteners | Sucralose | Kg | 0.2 | 0.2 | | | | 0.2 | | 0.1 |
| | Stevia | Kg | | | | | 0.1 | | | |
| Fruit juices | Apple juice | Kg | 20 | 20 | 100 | | | | | |
| | Blueberry juice | Kg | | | | 20 | | | | |
| | Plum juice | Kg | | | | | | 20 | | |
| | Pink grapefruit juice | Kg | | | | | 20 | | | |
| | Cassis juice | Kg | | | | | | | | 10 |
| | Pomegranate juice | Kg | | | | | | | | 10 |
| | Acai juice | Kg | | | | | | | | 10 |
| | Yuzu juice | Kg | | | | | | | 10 | |
| | Tangerine juice | Kg | | | | | | | 10 | |
| | Orange juice | Kg | | | | | | | 10 | |
| | Bergamot juice | Kg | | | | | | | 10 | |
| Tea and herbs | Green tea | Kg | | | | | 50 | | | |
| | Oolong tea | Kg | | | | | | 50 | | |
| | Jasmine tea | Kg | | | | | | | 100 | |
| | Chamomile tea | Kg | | | | | | | | 100 |
| | Mint extract | Kg | | | | | | | | 1 |
| | Water | Kg | + | + | + | + | + | + | + | + |
| | Total | Kg | 1,000 | 1,000 | 1,000 | 1,000 | 1,000 | 1,000 | 1,000 | 1,000 |

TABLE 8

| Starting material | | | Example 65 Yogurt vinegar drink | Example 66 Protein vinegar drink | Example 67 Vegetable & vinegar drink | Example 68 Tropical fruit & vinegar drink | Example 69 Concentrated vinegar drink | Example 70 Vinegar water (with no fruit juices) | Example 71 Vinegar jelly drink |
|---|---|---|---|---|---|---|---|---|---|
| | | | | | | Formulation | | | |
| Table vinegar | Brewed vinegar (acidity: 15%) | kg | | | 30 | | 300 | 10 | 15 |
| | Black vinegar (Acidity 5%) | kg | 10 | | | | 300 | | |
| | Grape vinegar (Acidity 5%) | kg | | 100 | | 60 | | 10 | |
| Organic acid | Citric acid | kg | | | | | 10 | 2 | |
| | Malic acid | kg | | | | | | 1 | 3 |
| | L-Ascorbic acid | kg | | 10 | | 30 | | 30 | |
| | Lactic acid | kg | | 10 | | | | 1 | |
| | Tartaric acid | kg | | | | | 10 | 1 | |
| Sugars | Sugar | kg | | 10 | | | 50 | | 100 |
| | Glucose | kg | 30 | | | | | | |
| | Fructose | kg | 30 | | | | | | |
| | Fructose glucose syrup | kg | | 30 | | | 100 | 10 | |
| | Honey | kg | | | | | 20 | 5 | |
| Sweeteners | Sucralose | kg | | 0.1 | | | 2 | 0.2 | |
| | Stevia | kg | | 0.1 | | | | | |
| Fruit juices | Apple juice | kg | | | | | | 150 | |
| | Lemon Juice | kg | | | 20 | | | | |
| | Peach juice | kg | | | | 50 | | | |
| | Mango juice | kg | | | | 200 | | | |
| | Lychee juice | kg | | | | 50 | | | |
| | Raspberry juice | kg | | | | | 50 | | |

TABLE 8-continued

| Starting material | | | Example 65 Yogurt vinegar drink | Example 66 Protein vinegar drink | Example 67 Vegetable & vinegar drink | Example 68 Tropical fruit & vinegar drink Formulation | Example 69 Concentrated vinegar drink | Example 70 Vinegar water (with no fruit juices) | Example 71 Vinegar jelly drink |
|---|---|---|---|---|---|---|---|---|---|
| | Grape juice | kg | | | | | 50 | | |
| | White grape juice | kg | 10 | | | | | | |
| | Strawberry juice | kg | | | | | 50 | | |
| | Passion fruit juice | kg | | | | 200 | | | |
| | Guava fruit juice | kg | | | | 200 | | | |
| | Hassaku orange juice | kg | | | | 50 | | | |
| Tea and herbs | Black tea | kg | | | | | | | 100 |
| | Rosehip tea | kg | | | | | 50 | | |
| | Cocoa | kg | | 10 | | | | | |
| | Mint extract | kg | | | | | | 0.5 | |
| | Rosemary extract | kg | | | | | | 0.1 | |
| | Oregano | kg | | | 1 | | | | |
| | Basil | kg | | | 1 | | | | |
| | Parsley | kg | | | 5 | | | | |
| | Cinnamon | kg | | | | | | | 1 |
| Dairy products | Yogurt | kg | 10 | | | | | | |
| | Whey | kg | | 50 | | | | | |
| | Soy Protein | kg | | 50 | | | | | |
| Vegetables | Tomato juice | kg | | | 938 | | | | |
| Thickening polysaccharide | Dietary fiber | kg | | 10 | | | 10 | 10 | |
| | Xanthan gum | kg | | | | | 2 | | |
| | Konjac flour | kg | | | | | | 5 | |
| | Agar | kg | | | | | 8 | | 10 |
| Fats and oils | Vegetable fat and oil | kg | | 30 | | | | | |
| Salts | Table salt | kg | | | 5 | | | 7 | |
| | Water | kg | + | + | − | + | + | + | + |
| | Total | kg | 1,000 | 1,000 | 1,000 | 1,000 | 1,000 | 1,000 | 1,000 |

TABLE 9

| | | Comparative Example 1 Apple vinegar drink | Example 58 Apple vinegar drink A | Example 59 Apple vinegar drink B | Example 60 Blueberry vinegar drink | Example 61 Grape fruit vinegar drink | Example 62 Plum vinegar drink | Example 63 Citrus mixed vinegar drink | Example 64 Herb vinegar drink |
|---|---|---|---|---|---|---|---|---|---|
| Acetic acid | w/v % | 0.20 | 0.20 | 0.20 | 0.25 | 0.25 | 0.30 | 0.30 | 0.15 |
| Ethyl acetate | ppm | 40 | 40 | 5 | 30 | 30 | 80 | 100 | 10 |
| Acetaldehyde | ppm | 20 | 20 | 1 | 15 | 15 | 40 | 100 | 2 |
| a: Butyl propionate | ppb | 0 | 5,000 | 300 | 10 | 5,000 | 1 | 0 | 100 |
| b: Isoamyl acetate | ppb | 0 | 0 | 400 | 600 | 600 | 80 | 80 | 500 |
| c: 2-Butanone | ppb | 0 | 50 | 5 | 10 | 50 | 5 | 5 | 30 |
| d: 3-Methylbutanal | ppb | 0 | 40 | 5 | 20 | 50 | 1 | 1 | 30 |
| Total content of components a and b | ppb | 0 | 5,000 | 700 | 610 | 5,600 | 81 | 80 | 600 |
| Total content of components a to d | ppb | 0 | 5,090 | 710 | 639 | 5,700 | 87 | 86 | 660 |
| Acetic acid/Total content of components a and b | w/v %/ ppb | — | 0.00004 | 0.0003 | 0.0004 | 0.00004 | 0.0037 | 0.0038 | 0.0003 |
| Acetic acid/Total content of components a to d | w/v %/ ppb | — | 0.00004 | 0.0003 | 0.0004 | 0.00004 | 0.0034 | 0.0035 | 0.0002 |
| Ethyl acetate/Total content of components a and b | ppm/ ppb | — | 0.0080 | 0.0071 | 0.0492 | 0.0054 | 0.9877 | 1.2500 | 0.0167 |
| Ethyl acetate/Total content of components a to d | ppm/ ppb | — | 0.0079 | 0.0070 | 0.0469 | 0.0053 | 0.9195 | 1.1628 | 0.0152 |
| Acetaldehyde/Total content of components a and b | ppm/ ppb | — | 0.0040 | 0.0014 | 0.0246 | 0.0027 | 0.4938 | 1.2500 | 0.0033 |

TABLE 9-continued

| | | Comparative Example 1 Apple vinegar drink | Example 58 Apple vinegar drink A | Example 59 Apple vinegar drink B | Example 60 Blueberry vinegar drink | Example 61 Grape fruit vinegar drink | Example 62 Plum vinegar drink | Example 63 Citrus mixed vinegar drink | Example 64 Herb vinegar drink |
|---|---|---|---|---|---|---|---|---|---|
| Acetaldehyde/Total content of components a to d | ppm/ppb | — | 0.0039 | 0.0014 | 0.0235 | 0.0026 | 0.4598 | 1.1628 | 0.0030 |
| BX | ○ | 0.3 | 0.3 | 4.2 | 6.1 | 1.6 | 1.4 | 4.3 | 1.5 |
| pH | — | 3.8 | 3.8 | 2.7 | 2.9 | 2.8 | 2.6 | 2.7 | 2.9 |
| Sugar-acid ratio (Bx/Acetic acid) | — | 1.5 | 1.5 | 21.0 | 24.4 | 6.4 | 4.7 | 14.3 | 10.0 |
| Sensory evaluation (average) | Body sensation | 1.8 | 4.5 | 4.7 | 4.8 | 4.8 | 4.7 | 4.4 | 4.8 |
| | Acetic acid odor | 1.9 | 4.5 | 4.7 | 4.7 | 4.5 | 4.5 | 4.7 | 4.7 |
| | Pungent odor | 1.2 | 4.7 | 4.8 | 4.7 | 4.6 | 4.5 | 4.6 | 4.7 |
| | Average | 1.6 | 4.6 | 4.7 | 4.7 | 4.6 | 4.6 | 4.6 | 4.7 |
| | Total evaluation | D | A | A | A | A | A | A | A |

TABLE 10

| | | Example 65 Yogurt vinegar drink | Example 66 Protein vinegar drink | Example 67 Vegetable & vinegar drink | Example 68 Tropical fruit & vinegar drink | Example 69 Concentrated vinegar drink | Example 70 Vinegar water (with no fruit juices) | Example 71 Vinegar jelly drink |
|---|---|---|---|---|---|---|---|---|
| Acetic acid | w/v % | 0.05 | 0.50 | 0.45 | 0.30 | 6.00 | 0.20 | 0.23 |
| Ethyl acetate | ppm | 20 | 100 | 500 | 1,000 | 5,000 | 50 | 50 |
| Acetaldehyde | ppm | 10 | 100 | 300 | 500 | 1,000 | 50 | 30 |
| a: Butyl propionate | ppb | 5 | 100 | 100 | 0 | 100 | 50,000 | 0.1 |
| b: Isoamyl acetate | ppb | 100 | 500 | 500 | 500 | 0 | 10,000 | 0.1 |
| c: 2-Butanone | ppb | 10 | 0 | 30 | 30 | 30 | 2,000 | 0.5 |
| d: 3-Methylbutanal | ppb | 20 | 30 | 0 | 30 | 30 | 1,000 | 0.5 |
| Total content of components a and b | ppb | 105 | 600 | 600 | 500 | 100 | 60,000 | 0 |
| Total content of components a to d | ppb | 134 | 630 | 630 | 560 | 160 | 63,000 | 1 |
| Acetic acid/Total content of components a and b | w/v %/ppb | 0.0005 | 0.0008 | 0.0008 | 0.0006 | 0.0600 | 0.000003 | 1.1500 |
| Acetic acid/Total content of components a to d | w/v %/ppb | 0.0004 | 0.0008 | 0.0007 | 0.0005 | 0.0375 | 0.000003 | 0.1917 |
| Ethyl acetate/Total content of components a and b | ppm/ppb | 0.1913 | 0.1667 | 0.8333 | 2.0000 | 50.0000 | 0.0008 | 250.0000 |
| Ethyl acetate/Total content of components a to d | ppm/ppb | 0.1492 | 0.1587 | 0.7937 | 1.7857 | 31.2500 | 0.0008 | 41.6667 |
| Acetaldehyde/Total content of components a and b | ppm/ppb | 0.0956 | 0.1667 | 0.5000 | 1.0000 | 10.0000 | 0.0008 | 150.0000 |
| Acetaldehyde/Total content of components a to d | ppm/ppb | 0.0746 | 0.1587 | 0.4762 | 0.8929 | 6.2500 | 0.0008 | 25.0000 |
| BX | ○ | 6.2 | 3.3 | 18.5 | 17.0 | 19.0 | 2.5 | 14.0 |
| pH | | 3.0 | 3.5 | 3.8 | 3.3 | 2.7 | 3.0 | 3.8 |
| Sugar/Acid ratio (Bx/Acetic acid) | — | 124.0 | 6.6 | 41.1 | 56.7 | 3.2 | 12.5 | 60.9 |
| Sensory evaluation (average) | Body sensation | 4.6 | 4.6 | 4.7 | 4.4 | 4.4 | 4.9 | 4.4 |
| | Acetic acid odor | 4.4 | 4.6 | 4.1 | 4.7 | 4.6 | 4.8 | 4.6 |
| | Pungent odor | 4.5 | 4.3 | 4.7 | 4.6 | 4.6 | 4.7 | 4.7 |
| | Average | 4.5 | 4.5 | 4.5 | 4.6 | 4.5 | 4.8 | 4.6 |
| | Total evaluation | A | A | A | A | A | A | A |

Test Example 3: Flavor Evaluation Test 3

Various seasonings were prepared and their flavors were evaluated. The measurement of the contents of acetic acid, ethyl acetate, acetaldehyde, and components a to d (the same components as used in Test Example 1 were used) and flavor evaluation were performed in the same manner as in Test Example 2.

Test Example 3-1: Seasoning Jelly

Seasoning jelly was prepared by blending ingredients according to the formulation shown in Table 11 and appropriately adding acetic acid, ethyl acetate, acetaldehyde, and components a to d to achieve the contents shown in Table 12. Table 12 shows the results.

TABLE 11

| Starting material | Unit | Amount |
|---|---|---|
| Brewed vinegar (acidity: 5%) | kg | 134 |
| Sugar | kg | 125 |
| Sweeteners (sucralose) | kg | 0.1 |
| Yuzu juice | kg | 100 |
| Carrageenan | kg | 60 |
| Agar | kg | 50 |
| Water | kg | + |
| Total | kg | 1,000 |

TABLE 12

| | | Comparative Example 2 | Example 72 |
|---|---|---|---|
| Acetic acid | w/v % | 2.0 | 2.0 |
| Ethyl acetate | ppm | 104 | 104 |
| Acetaldehyde | ppm | 53 | 53 |
| BX | ° | 20.0 | 20.0 |
| pH | — | 3.0 | 3.0 |
| a: Butyl propionate | ppb | 0 | 20 |
| b: Isoamyl acetate | ppb | 0 | 500 |
| c: 2-Butanone | ppb | 0 | 10 |
| d: 3-Methylbutanal | ppb | 0 | 20 |
| Total content of components a and b | ppb | 0 | 520 |

TABLE 12-continued

| | | Comparative Example 2 | Example 72 |
|---|---|---|---|
| Total content of components a to d | ppb | 0 | 550 |
| Acetic acid/Total content of components a and b | %/ppb | — | 0.004 |
| Acetic acid/Total content of components a to d | %/ppb | — | 0.004 |
| Ethyl acetate/Total content of components a and b | ppm/ppb | — | 0.200 |
| Ethyl acetate/Total content of components a to d | ppm/ppb | — | 0.189 |
| Acetaldehyde/Total content of components a and b | ppm/ppb | — | 0.102 |
| Acetaldehyde/Total content of components a to d | ppm/ppb | — | 0.096 |
| Sensory evaluation (average) | Body sensation | 3.0 | 4.8 |
| | Acetic acid odor | 2.8 | 4.7 |
| | Pungent odor | 2.7 | 4.7 |
| | Average | 2.8 | 4.7 |
| | Total evaluation | D | A |

Test Example 3-2: Sushi Vinegar

Sushi vinegar was prepared by blending ingredients according to the formulation shown in Table 13 and appropriately adding acetic acid, ethyl acetate, acetaldehyde, and components a to d to achieve the contents shown in Table 14. Table 14 shows the results.

TABLE 13

| Starting material | Unit | Type A | Type B |
|---|---|---|---|
| Brewed vinegar (acidity: 15%) | kg | 54 | 500 |
| Sugar | kg | 350 | 350 |
| Salt | kg | 50 | 100 |
| Soup stock made from kelp | kg | 0 | 10 |
| Sodium glutamate | kg | 0 | 10 |
| Water | kg | + | + |
| Sum | kg | 1,000 | 1,000 |

TABLE 14

| | | Comparative Example 3 | Example 73 | Comparative Example 4 | Example 74 |
|---|---|---|---|---|---|
| | | Type A | Type A | Type B | Type B |
| Acetic acid | w/v % | 0.8 | 0.8 | 7.5 | 7.5 |
| Ethyl acetate | ppm | 32 | 32 | 1,050 | 1,050 |
| Acetaldehyde | ppm | 5 | 5 | 498 | 498 |
| BX | ° | 35.6 | 35.6 | 36.7 | 36.7 |
| pH | — | 2.6 | 2.6 | 2.5 | 2.5 |
| a: Butyl propionate | ppb | 0 | 80 | 0 | 2 |
| b: Isoamyl acetate | ppb | 0 | 600 | 0 | 80 |
| c: 2-Butanone | ppb | 0 | 30 | 0 | 5 |
| d: 3-Methylbutanal | ppb | 0 | 30 | 0 | 1 |
| Total content of components a and b | ppb | 0 | 680 | 0 | 82 |
| Total content of components a to d | ppb | 0 | 740 | 0 | 88 |
| Acetic acid/Total content of components a and b | %/ppb | — | 0.001 | — | 0.011 |

TABLE 14-continued

|  |  | Comparative Example 3 | Example 73 | Comparative Example 4 | Example 74 |
|  |  | Type A | | Type B | |
|---|---|---|---|---|---|
| Acetic acid/Total content of components a to d | %/ppb | — | 0.001 | — | 0.010 |
| Ethyl acetate/Total content of components a and b | ppm/ppb | — | 0.047 | — | 1.544 |
| Ethyl acetate/Total content of components a to d | ppm/ppb | — | 0.043 | — | 1.419 |
| Acetaldehyde/Total content of components a and b | ppm/ppb | — | 0.007 | — | 0.732 |
| Acetaldehyde/Total content of components a to d | ppm/ppb | — | 0.007 | — | 0.673 |
| Sensory evaluation (average) | Body sensation | 1.6 | 4.7 | 1.8 | 4.7 |
|  | Acetic acid odor | 1.7 | 4.7 | 1.5 | 4.5 |
|  | Pungent odor | 1.7 | 4.7 | 1.2 | 4.6 |
|  | Average | 1.7 | 4.7 | 1.4 | 4.6 |
|  | Total evaluation | D | A | D | A |

Test Example 3-3: Seasoning Vinegar

Seasoning vinegar was prepared by blending ingredients according to the formulation shown in Table 15 and appropriately adding acetic acid, ethyl acetate, acetaldehyde, and components a to d to achieve the contents shown in Table 16. Table 16 shows the results.

TABLE 15

| Starting material | Unit | Type A | Type B | Type C |
|---|---|---|---|---|
| Brewed vinegar (acidity: 15%) | kg | 100 | 100 | 700 |
| Sugar | kg | 100 | 0 | 0 |

TABLE 15-continued

| Starting material | Unit | Type A | Type B | Type C |
|---|---|---|---|---|
| Fructose glucose syrup | kg | 70 | 100 | 0 |
| Lemon fruit juice | kg | 0 | 50 | 10 |
| Salt | kg | 80 | 20 | 0 |
| Soy sauce | kg | 0 | 400 | 0 |
| Sodium glutamate | kg | 0 | 20 | 0 |
| Basil | kg | 2 | 0 | 0 |
| Mint | kg | 0 | 0 | 10 |
| Water | kg | + | + | + |
| Total | kg | 1,000 | 1,000 | 1,000 |

TABLE 16

|  |  | Comparative Example 5 | Example 75 | Example 76 | Example 77 | Example 78 |
|  |  |  | Type A | | Type B | Type C |
|---|---|---|---|---|---|---|
| Acetic acid | w/v % | 1.5 | 1.5 | 1.5 | 1.5 | 10.5 |
| Ethyl acetate | ppm | 60 | 60 | 60 | 60 | 420 |
| Acetaldehyde | ppm | 10 | 10 | 10 | 10 | 70 |
| BX | ○ | 15.8 | 15.8 | 15.8 | 9.9 | 0.8 |
| pH | — | 2.5 | 2.5 | 2.5 | 4.1 | 2.3 |
| a: Butyl propionate | ppb | 0 | 100,000 | 5,000 | 5,000 | 5,000 |
| b: Isoamyl acetate | ppb | 0 | 100,000 | 600 | 600 | 600 |
| c: 2-Butanone | ppb | 0 | 15,000 | 50 | 50 | 50 |
| d: 3-Methylbutanal | ppb | 0 | 15,000 | 50 | 50 | 50 |
| Total content of components a and b | ppb | 0 | 200,000 | 5,600 | 5,600 | 5,600 |
| Total content of components a to d | ppb | 0 | 230,000 | 5,700 | 5,700 | 5,7000 |
| Acetic acid/Total content of components a and b | %/ppb | — | 0.000008 | 0.000268 | 0.000268 | 0.001875 |
| Acetic acid/Total content of components a to d | %/ppb | — | 0.000007 | 0.000263 | 0.000263 | 0.001842 |
| Ethyl acetate/Total content of components a and b | ppm/ppb | — | 0.000300 | 0.010714 | 0.010714 | 0.075000 |
| Ethyl acetate/Total content of components a to d | ppm/ppb | — | 0.000261 | 0.010526 | 0.010526 | 0.073684 |
| Acetaldehyde/Total content of components a and b | ppm/ppb | — | 0.000050 | 0.001786 | 0.001786 | 0.012500 |
| Acetaldehyde/Total content of | | | | | | |

TABLE 16-continued

|  |  | Comparative Example 5 | Example 75 Type A | Example 76 | Example 77 Type B | Example 78 Type C |
|---|---|---|---|---|---|---|
| components a to d | ppm/ppb | — | 0.000043 | 0.001754 | 0.001754 | 0.012281 |
| Sensory evaluation (average) | Body sensation | 2.2 | 4.8 | 4.8 | 4.9 | 4.4 |
|  | Acetic acid odor | 2.6 | 4.9 | 4.6 | 4.8 | 4.4 |
|  | Pungent odor | 2.4 | 4.9 | 4.6 | 4.8 | 4.4 |
|  | Average | 2.5 | 4.9 | 4.6 | 4.8 | 4.4 |
| Total evaluation |  | D | A | A | A | A |

Test Example 3-4: Soup Base soup base was prepared by blending ingredients according to the formulation shown in Table 17 and appropriately adding acetic acid, ethyl acetate, acetaldehyde, and components a to d to achieve the contents shown in Table 18. Table 18 shows the results.

TABLE 17

| Ingredients | Unit | Amount |
|---|---|---|
| Brewed vinegar (acidity: 15%) | kg | 1.5 |
| Fructose glucose syrup | kg | 200 |
| Salt | kg | 40 |
| Soy sauce | kg | 100 |
| Dashi (kelp and bonito) | kg | 200 |
| Water | kg | + |
| Total |  | 1,000 |

TABLE 18

|  |  | Comparative Example 6 | Example 79 |
|---|---|---|---|
| Acetic acid | % | 0.02 | 0.02 |
| Ethyl acetate | ppm | 1.0 | 1.0 |
| Acetaldehyde | ppm | 1 | 1 |
| BX | ° | 15.1 | 15.1 |
| pH | — | 4.0 | 4.0 |
| a: Butyl propionate | ppb | 0 | 10,000 |
| b: Isoamyl acetate | ppb | 0 | 10,000 |
| c: 2-Butanone | ppb | 0 | 200 |
| d: 3-Methylbutanal | ppb | 0 | 200 |
| Total content of components a and b | ppb | 0 | 20,000 |
| Total content of components a to d | ppb | 0 | 20,400 |
| Acetic acid/Total content of components a and b | w/v %/ppb | — | 0.000001 |
| Acetic acid/Total content of components a to d | w/v %/ppb | — | 0.0000010 |
| Ethyl acetate/Total content of components a and b | ppm/ppb | — | 0.000050 |
| Ethyl acetate/Total content of components a to d | ppm/ppb | — | 0.000049 |
| Acetaldehyde/Total content of components a and b | ppm/ppb | — | 0.000050 |
| Acetaldehyde/Total content of components a to d | ppm/ppb | — | 0.0000490 |

TABLE 18-continued

|  |  | Comparative Example 6 | Example 79 |
|---|---|---|---|
| Sensory evaluation (average) | Body sensation | 2.3 | 4.8 |
|  | Acetic acid odor | 3.1 | 4.8 |
|  | Pungent odor | 2.7 | 4.7 |
|  | Average | 2.9 | 4.8 |
| Total evaluation |  | D | A |

Test Example 3-5: Sauce sauce was prepared by blending ingredients according to the formulation shown in Table 19 and appropriately adding acetic acid, ethyl acetate, acetaldehyde, and components a to d to achieve the contents shown in Table 20. Table 20 shows the results.

TABLE 19

| Starting material | Unit | Amount |
|---|---|---|
| Brewed vinegar (acidity: 15%) | kg | 33 |
| Fructose glucose syrup | kg | 400 |
| Sodium glutamate | kg | 10 |
| Salt | kg | 20 |
| Ketchup | kg | 50 |
| Miso | kg | 20 |
| Sesame | kg | 5 |
| Onion | kg | 10 |
| Garlic | kg | 5 |
| Ginger | kg | 5 |
| Pepper | kg | 5 |
| Chili pepper | kg | 5 |
| Sesame oil | kg | 100 |
| Xanthan gum | kg | 1 |
| Starch | kg | 30 |
| Water | kg | + |
| Total |  | 1,000 |

TABLE 20

|  |  | Comparative Example 7 | Example 80 |
|---|---|---|---|
| Acetic acid | % | 0.50 | 0.50 |
| Ethyl acetate | ppm | 20 | 20 |
| Acetaldehyde | ppm | 3 | 3 |

TABLE 20-continued

| | | Comparative Example 7 | Example 80 |
|---|---|---|---|
| BX | ° | 31.6 | 31.6 |
| pH | — | 4.0 | 4.0 |
| a: Butyl propionate | ppb | 0 | 20 |
| b: Isoamyl acetate | ppb | 0 | 500 |
| c: 2-Butanone | ppb | 0 | 10 |
| d: 3-Methylbutanal | ppb | 0 | 10 |
| Total content of components a and b | ppb | 0 | 520 |
| Total content of components a to d | ppb | 0 | 540 |
| Acetic acid/Total content of components a and b | %/ppb | — | 0.000962 |
| Acetic acid/Total content of components a to d | %/ppb | — | 0.0009259 |
| Ethyl acetate/Total content of components a and b | ppm/ppb | — | 0.038462 |
| Ethyl acetate/Total content of components a to d | ppm/ppb | — | 0.037037 |
| Acetaldehyde/Total content of components a and b | ppm/ppb | — | 0.005769 |
| Acetaldehyde/Total content of components a to d | ppm/ppb | — | 0.005556 |
| Sensory evaluation (average) | Body sensation | 2.8 | 4.7 |
| | Acetic acid odor | 2.3 | 4.6 |
| | Pungent odor | 2.3 | 4.6 |
| | Average | 2.3 | 4.6 |
| | Total evaluation | D | A |

Test Example 3-6: Dressing

Dressings were prepared by blending ingredients according to the formulations shown in Table 21 and appropriately adding acetic acid, ethyl acetate, acetaldehyde, and components a to d to achieve the contents shown in Table 22. Table 22 shows the results.

TABLE 21

| Ingredients | Unit | Type A | Type B |
|---|---|---|---|
| Brewed vinegar (acidity: 15%) | kg | 50 | 50 |
| Sugar | kg | 150 | 0 |
| Mizuame (syrup) | kg | 0 | 80 |
| Sucralose | kg | 0 | 0.1 |
| Fruit juices | kg | 100 | 0 |
| Salt | kg | 20 | 30 |
| Soy sauce | kg | 200 | 60 |
| Soup stock made from bonito | kg | 20 | 0 |
| Sodium glutamate | kg | 0 | 5 |
| Sesame | kg | 20 | 100 |
| Onion | kg | 50 | 0 |
| Ginger | kg | 5 | 0 |
| Pepper | kg | 5 | 3 |
| Salad oil | kg | 0 | 200 |
| Agar | kg | 20 | 10 |
| Egg yolk | kg | 0 | 10 |
| Water | kg | + | + |
| Total | | 1,000 | 1,000 |

TABLE 22

| | | Comparative Example 8 | Example 81 | Comparative Example 9 | Example 82 |
|---|---|---|---|---|---|
| | | Type A | | Type B | |
| Acetic acid | % | 0.8 | 0.8 | 0.8 | 0.8 |
| Ethyl acetate | ppm | 32 | 32 | 30 | 30 |
| Acetaldehyde | ppm | 6 | 6 | 5 | 5 |
| BX | ° | 17.2 | 17.2 | 7.6 | 7.6 |
| PH | — | 3.9 | 3.9 | 3.9 | 3.9 |
| a: Butyl propionate | ppb | 0 | 1 | 0 | 1 |
| b: Isoamyl acetate | ppb | 0 | 80 | 0 | 80 |
| c: 2-Butanone | ppb | 0 | 5 | 0 | 5 |
| d: 3-Methylbutanal | ppb | 0 | 1 | 0 | 1 |
| Total content of components a and b | ppb | 0 | 81 | 0 | 81 |
| Total content of components a to d | ppb | 0 | 87 | 0 | 87 |
| Acetic acid/Total content of components a and b | %/ppb | — | 0.0093 | — | 0.0093 |
| Acetic acid/Total content of components a to d | %/ppb | — | 0.0086 | — | 0.0086 |
| Ethyl acetate/Total content of components a and b | ppm/ppb | — | 0.3951 | — | 0.3704 |
| Ethyl acetate/Total | ppm/ppb | — | 0.3678 | — | 0.3448 |

TABLE 22-continued

| | | Comparative Example 8 | Example 81 | Comparative Example 9 | Example 82 |
|---|---|---|---|---|---|
| | | Type A | | Type B | |
| content of components a to d Acetaldehyde/Total content of components a and b | ppm/ppb | — | 0.0741 | — | 0.0617 |
| Acetaldehyde/Total content of components a to d | ppm/ppb | — | 0.0690 | — | 0.0575 |
| Sensory evaluation (average) | Body sensation | 1.8 | 4.8 | 2.5 | 4.6 |
| | Acetic acid odor | 2.2 | 4.8 | 2.3 | 4.5 |
| | Pungent odor | 2.1 | 4.7 | 2.2 | 4.5 |
| | Average | 2.2 | 4.8 | 2.3 | 4.5 |
| | Total evaluation | D | A | D | A |

The invention claimed is:

1. An acetic acid-containing drink comprising:
0.02 w/v % or more of acetic acid;
3 ppm or more of ethyl acetate;
0.05 to 100000 ppb of butyl propionate (component a); and
0.005 to 50000 ppb of isoamyl acetate (component b),
wherein a ratio of an ethyl acetate content to a total content of components a and b (ethyl acetate concentration value (ppm)/total concentration value of a and b (ppb)) is 0.01 to 25000, and
wherein the acetic acid-containing drink is a fruit juice-containing drink.

2. The acetic acid-containing drink according to claim 1, further comprising 2-butanone (component c).

3. The acetic acid-containing drink according to claim 2, wherein a content of the component c is 0.01 to 15000 ppb.

4. The acetic acid-containing drink according to claim 1, further comprising 3-methylbutanal (component d).

5. The acetic acid-containing drink according to claim 4, wherein a content of the component d is 0.01 to 15000 ppb.

6. The acetic acid-containing drink according to claim 1, wherein a ratio of the acetic acid content to a total content of the components a and b (acetic acid concentration value (w/v %)/total concentration value of a and b (ppb)) is 0.00002 to 100.

7. The acetic acid-containing drink according to claim 1, further comprising 1 ppm or more of acetaldehyde, wherein a ratio of an acetaldehyde content to a total content of the component a and the component b (acetaldehyde concentration value (ppm)/total concentration value of a and b (ppb)) is 0.0001 to 12500.

8. The acetic acid-containing drink according to claim 1, further comprising:
2-butanone (component c); and
3-methylbutanal (component d),
wherein a ratio of an acetic acid content to a total content of the component a, the component b, the component c, and the component d (acetic acid concentration value (w/v %)/total concentration value of a to d (ppb)) is 0.00002 to 100.

9. The acetic acid-containing drink according to claim 1, wherein a content of the component a is 0.5 to 1000 ppb.

10. The acetic acid-containing drink according to claim 1, wherein a content of the acetic acid is 0.02 w/v % to 3 w/v %.

11. The acetic acid-containing drink according to claim 1, wherein:
the acetic acid content is 0.05 to 0.5 w/v %,
the butyl propionate (component a) content is 0.8 to 50000 ppb; and
the isoamyl acetate (component b) content is 20 to 20000 ppb;
wherein the acetic acid-containing drink further comprises:
1 to 10000 ppb of 2-butanone (component c); and
0.1 to 10000 ppb of 3-methylbutanal (component d),
wherein a total content of components a and b is 1 to 20000 ppb,
a ratio of an ethyl acetate content to the total content of the components a and b (ethyl acetate concentration value (ppm)/total concentration value of a and b (ppb)) is 0.1 to 8000,
a ratio of an acetaldehyde content to the total content of the components a and b (acetaldehyde concentration value (ppm)/total concentration value of a and b (ppb)) is 0.1 to 6000,
a ratio of the ethyl acetate content to the total content of the components a to d (ethyl acetate concentration value (ppm)/total concentration value of a to d (ppb)) is 0.1 to 8000, and
a ratio of the acetaldehyde content to the total content of the components a to d (acetaldehyde concentration value (ppm)/total concentration value of a to d (ppb)) is 0.1 to 6000.

12. The acetic acid-containing drink according to claim 1, wherein an acetic acid content is 0.02 to 3 w/v %, and wherein the acetic acid-containing drink further comprises:
1 ppm or more of acetaldehyde;
0.01 to 15000 ppb of 2-butanone (component c); and
0.01 to 15000 ppb of 3-methylbutanal (component d),
wherein a ratio of an acetic acid content to the total content of the components a and b (acetic acid concentration value (w/v %)/total concentration value of a and b (ppb)) is 0.00002 to 100,
a ratio of an acetaldehyde content to the total content of the components a and b (acetaldehyde concentration value (ppm)/total concentration value of a and b (ppb)) is 0.0001 to 12,500,

a ratio of the acetic acid content to a total content of the components a to d (acetic acid concentration value (w/v %)/total concentration value of a to d (ppb)) is 0.00002 to 100, a ratio of the ethyl acetate content to the total content of the components a to d (ethyl acetate concentration value (ppm)/total concentration value of a to d (ppb)) is 0.1 to 8000, a ratio of the acetaldehyde content to the total content of the components a to d (acetaldehyde concentration value (ppm)/total concentration value of a to d (ppb)) is 0.1 to 6000.

13. The acetic acid-containing drink according to claim 1, wherein:

the acetic acid content is 0.05 to 0.5 w/v %, the butyl propionate (component a) content is 0.8 to 50000 ppb; and the isoamyl acetate (component b) content is 20 to 20000 ppb;

wherein the acetic acid-containing drink further comprises:

1 ppm or more of acetaldehyde;

1 to 10000 ppb of 2-butanone (component c); and 0.1 to 10000 ppb of 3-methylbutanal (component d), wherein a total content of components a and b is 1 to 20000 ppb, a ratio of an ethyl acetate content to the total content of the components a and b (ethyl acetate concentration value (ppm)/total concentration value of a and b (ppb)) is 0.1 to 8000, a ratio of the ethyl acetate content to the total content of the components a to d (ethyl acetate concentration value (ppm)/total concentration value of a to d (ppb)) is 0.1 to 8000.

14. An acetic acid-containing drink comprising:

0.05 to 3 w/v % of acetic acid;

3 ppm or more of ethyl acetate;

1 ppm or more of acetaldehyde;

0.8 to 50000 ppb of butyl propionate (component a);

20 to 20000 ppb of isoamyl acetate (component b);

1 to 10000 ppb of 2-butanone (component c); and 0.1 to 10000 ppb of 3-methylbutanal (component d), wherein a total content of components a and b is 1 to 20000 ppb, a ratio of an acetic acid content to the total content of the components a and b (acetic acid concentration value (w/v %)/total concentration value of a and b (ppb)) is 0.001 to 20, a ratio of an ethyl acetate content to the total content of the components a and b (ethyl acetate concentration value (ppm)/total concentration value of a and b (ppb)) is 0.1 to 8000,

a ratio of an acetaldehyde content to the total content of the components a and b (acetaldehyde concentration value (ppm)/total concentration value of a and b (ppb)) is 0.1 to 6000, a ratio of the acetic acid content to a total content of the components a to d (acetic acid concentration value (w/v %)/total concentration value of a to d (ppb)) is 0.001 to 20, a ratio of the ethyl acetate content to the total content of the components a to d (ethyl acetate concentration value (ppm)/total concentration value of a to d (ppb) is 0.1 to 8000, a ratio of the acetaldehyde content to the total content of the components a to d (acetaldehyde concentration value (ppm)/total concentration value of a to d (ppb)) is 0.1 to 6000, and the acetic acid-containing drink is a fruit juice-containing drink.

15. An acetic acid-containing drink comprising:

0.05 to 0.5 w/v % of acetic acid;

3 ppm or more of ethyl acetate;

1 ppm or more of acetaldehyde;

0.8 to 50000 ppb of butyl propionate (component a);

20 to 20000 ppb of isoamyl acetate (component b);

1 to 10000 ppb of 2-butanone (component c); and 0.1 to 10000 ppb of 3-methylbutanal (component d), wherein a total content of components a and b is 1 to 20000 ppb, a ratio of an acetic acid content to the total content of the components a and b (acetic acid concentration value (w/v %)/total concentration value of a and b (ppb)) is 0.001 to 20, a ratio of an ethyl acetate content to the total content of the components a and b (ethyl acetate concentration value (ppm)/total concentration value of a and b (ppb)) is 0.1 to 8000, a ratio of an acetaldehyde content to the total content of the components a and b (acetaldehyde concentration value (ppm)/total concentration value of a and b (ppb)) is 0.1 to 6000, a ratio of the acetic acid content to a total content of the components a to d (acetic acid concentration value (w/v %)/total concentration value of a to d (ppb)) is 0.001 to 20, a ratio of the ethyl acetate content to the total content of the components a to d (ethyl acetate concentration value (ppm)/total concentration value of a to d (ppb)) is 0.1 to 8000, a ratio of the acetaldehyde content to the total content of the components a to d (acetaldehyde concentration value (ppm)/total concentration value of a to d (ppb)) is 0.1 to 6000, and the acetic acid-containing drink is a fruit juice-containing drink.

* * * * *